INVENTORS F. B. ANDERSON
J. O. EDSON
BY [signature]
ATTORNEY

INVENTORS F. B. ANDERSON
J. O. EDSON
BY George C. Lord
ATTORNEY

INVENTORS: F. B. ANDERSON
J. O. EDSON

BY

ATTORNEY

May 6, 1958 F. B. ANDERSON ET AL 2,833,861

COMMUNICATION SYSTEM, INTERMEDIATE RELAY REPEATER STATION

Original Filed June 11, 1946 10 Sheets-Sheet 4

INVENTORS F. B. ANDERSON
J. O. EDSON

BY [signature]

ATTORNEY

INVENTORS F. B. ANDERSON
J. O. EDSON
BY George C. Lord
ATTORNEY

May 6, 1958 F. B. ANDERSON ET AL 2,833,861

COMMUNICATION SYSTEM, INTERMEDIATE RELAY REPEATER STATION

Original Filed June 11, 1946 10 Sheets-Sheet 6

INVENTORS F. B. ANDERSON
J. O. EDSON
BY George C. Lord
ATTORNEY

INVENTORS F. B. ANDERSON
J. O. EDSON
BY George C. Ford
ATTORNEY

May 6, 1958 F. B. ANDERSON ET AL 2,833,861

COMMUNICATION SYSTEM, INTERMEDIATE RELAY REPEATER STATION

Original Filed June 11, 1946 10 Sheets-Sheet 8

INVENTORS: F. B. ANDERSON
J. O. EDSON

BY George C. Ford

ATTORNEY

INVENTORS F. B. ANDERSON
J. O. EDSON
BY George C. Lord
ATTORNEY

INVENTORS: F. B. ANDERSON
J. O. EDSON

BY George ? Lord
ATTORNEY

United States Patent Office 2,833,861

Patented May 6, 1958

2,833,861

COMMUNICATION SYSTEM, INTERMEDIATE RELAY REPEATER STATION

Frithiof B. Anderson, Fanwood, and James O. Edson, Warren Township, Somerset County, N. J., assignors to Bell Telephone Laboratories, Incorporated, New York, N. Y., a corporation of New York Continuation of application Serial No. 675,902, June 11, 1946. This application October 6, 1952, Serial No. 313,278

10 Claims. (Cl. 179—15)

This application is a continuation of our application Serial No. 675,902, filed June 11, 1946, now abandoned.

This invention relates to a communication system and more particularly to a multichannel communication system in which the intelligence is transmitted by means of a large number of pulses of short duration occurring in rapid succession. Such pulses are suitable for transmission over the wide band communication systems, and more particularly over the so-called microwave, point-to-point, or line-of-sight radio paths.

An object of this invention is to employ a series or an array of pulses which may be coded or otherwise modulated to convey information of one or more channels and to further modulate said array of pulses in accordance with additional signals to be transmitted.

Another object of this invention is to provide improved methods and apparatus for time-modulating an array of pulses in accordance with information or signals to be transmitted.

In the past, so-called time-position or time-modulation systems have been devised in which the time of transmission of a pulse following some marker or synchronizing pulse is employed to convey the information or intelligence. In other systems in the prior art the time elapsed between the transmission of two pulses is so employed to convey the information. However, in all of these systems a synchronizing or marking pulse is transmitted from the transmitting station and serves as a reference point for one or more succeeding pulses.

In accordance with the present invention methods and apparatus are provided by which such an array of pulses may be time-modulated in accordance with additional information to be transmitted without the use of any marker or synchronizing pulses.

In accordance with certain types of communication systems the array of pulses is arranged in the form of code groups, each code group conveying a certain increment or quantity of information. The code groups are conveniently formed by pulses of two different types, that is, pulses of two different types of current or a pulse of either current or no current. In the latter case pulses are either present or they are not present. If such a random array of pulses were employed for carrier current in systems of prior art, an intolerable amount of noise would be introduced into the communication circuit by the random character or presence or absence of pulses, or by the pulses of different character in the array.

It is an object of the present invention to provide methods and apparatus for deriving the signals represented by the time modulation of the array of pulses and at the same time suppressing the noise occasioned by the random character of the individual pulses of the complete array.

In microwave communication systems employing substantially line-of-sight radio communication beams it is usually necessary or desirable to provide a group of intermediate relay repeater stations between the terminals of long communication circuits.

One of the advantages of such communication systems is that the pulses may be reformed at each of the radio relay stations and thus the distortion of each link or radio path is substantially eliminated before retransmission to the next radio relay station. In this manner the over-all distortion may be kept at a low level. In such systems it is sometimes desirable to permit channels to be terminated at intermediate relay points or at least to permit attendants at these points to communicate over the system.

It is an object of the present invention to provide a repeater suitable for reforming and reshaping pulses at intermediate relay stations for transmission to a succeeding relay station or terminal station.

Another object of the present invention is to permit the signals which are represented by time modulation of the complete array of signals to be demodulated at each or all of the intermediate relay repeater stations.

A further object of the invention is to provide methods and apparatus at each of the intermediate relay repeater stations for adding to the time-modulation of the array of pulses in accordance with various signals to be transmitted from each of the radio relay repeater points.

A feature of the invention relates to methods and apparatus for limiting the degree of time-modulation which may be superimposed upon an array of pulses so that none of the pulses can encroach upon the time allotted to any of the other pulses.

A further feature of the present invention relates to demodulating equipment which will in effect supply missing pulses for purposes of demodulation of the time-modulated pulses but will not in any way interfere with the repeating and reforming of the array of pulses received from the preceding radio path and transmitting them over the succeeding radio path.

Another feature of this invention is to provide circuits and equipment for permitting attendants installing and operating a comprehensive communication system to signal one another and communicate with one another over the system.

A feature of the present invention relates ot methods and apparatus for lengthening received pulses so that the leading and trailing edges thereof may be separated and either employed to the exclusion of the other for controlling circuits and equipment.

Another feature of the present invention relates to the transmission of received signals through a crystal oscillator or crystal filter element and then comparing the received signals before transmission through the crystal element with the signals after transmission through the crystal element and deriving therefrom a signal potential.

Other alarm supervisory and maintenance features are also provided to enable attendants and maintenance personnel to readily locate and remedy troubles and faulty operation.

The foregoing as well as other additional objects and features of this invention may be more readily understood from the following description of an exemplary embodiment thereof set forth in detail in the following description and drawings. The scope of the invention however is in no way limited to the exemplary embodiment described hereinafter in detail. This specific embodiment is not in any way intended to either limit or extend the scope of the attached claims which set forth the present invention.

Fig. 1 of the drawing shows the elements of a communication system comprising two terminals and an intermediate relay repeater station.

Figures 1, 10:
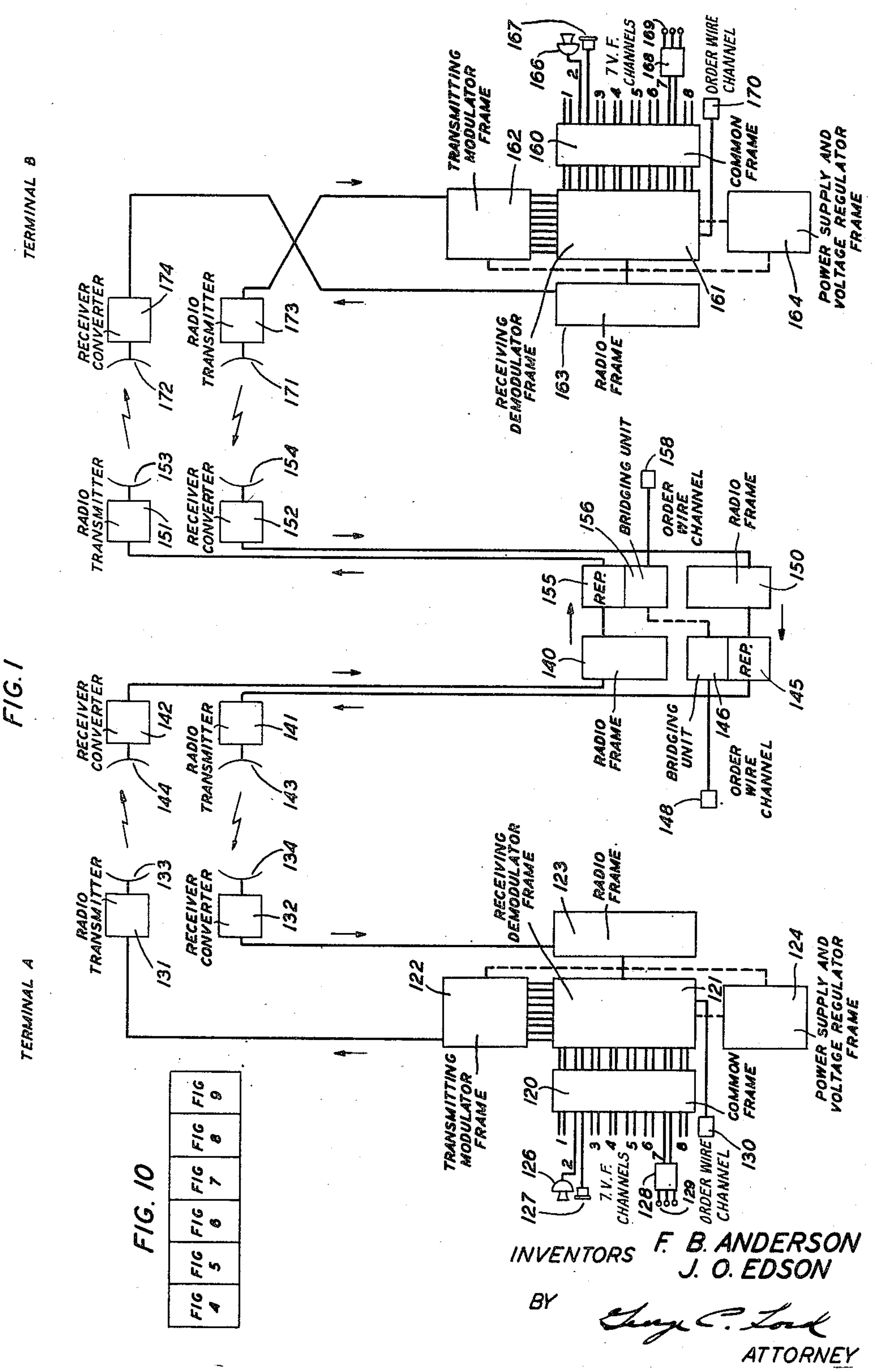

Figs. 4, 5, 6, 7, 8 and 9 when arranged as shown in Fig. 10 show the detailed circuits and their manner of inter-connection at an intermediate relay repeater point.

Fig. 10 shows the manner in which Figs. 4 through 9, inclusive are arranged adjacent one another to form the circuits at an intermediate relay repeater point.

Figure 11:
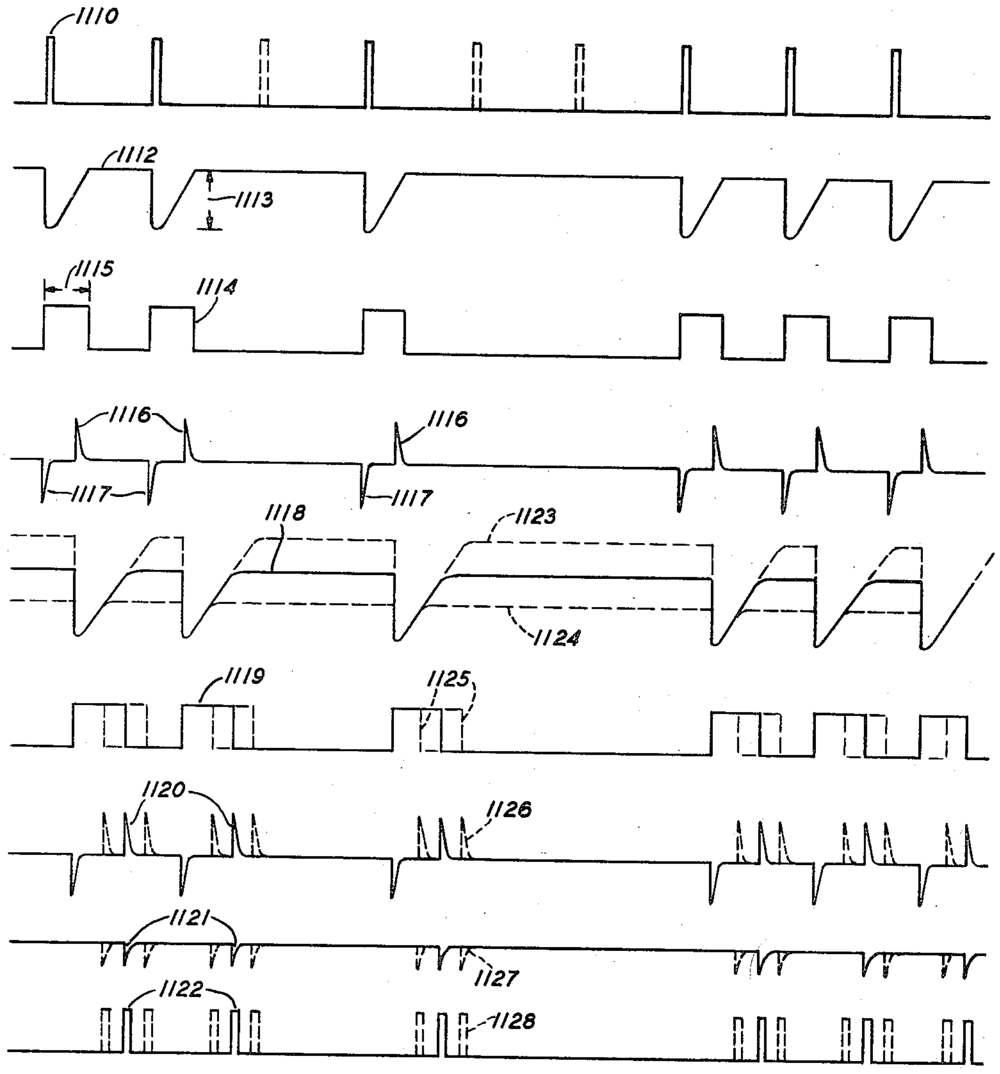

Fig. 11 is a graph showing the manner in which the voltage varies with time at various points in the system.

Figure 12:
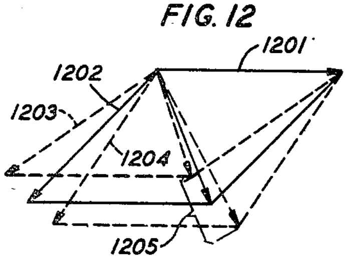

Fig. 12 shows the manner in which certain voltages or currents are combined.

*General description*

Fig. 1 shows in outline form the elements of an exemplary system incorporating the present invention. In the exemplary system described herein and shown in Fig. 1 the equipment has been arranged to provide for eight independent communication channels between terminal stations A and B. Furthermore, an additional communication channel designated the order wire circuit has been provided between these terminals. As will appear hereinafter the order wire circuit may be employed for communication between the various stations and repeater points of the system.

As shown in Fig. 1 the communication channels are provided between two terminal stations, terminal A and terminal B, through an intermediate relay repeater station. For purposes of illustration only a single intermediate relay radio station has been shown. However, persons skilled in the art will readily understand that when the terminals A and B are relatively near or close together the intermediate relay repeater station may be dispensed with.

However, when the two terminal stations A and B are further apart it will frequently be desirable to employ additional repeater stations between the terminals. In this case the intermediate relay repeater stations and the equipment located thereat are merely duplicated and the signals transmitted through these additional repeater stations in the same manner as described hereinafter for the repeater station actually shown in Fig. 1.

In the exemplary system described hereinafter and shown in Fig. 1 each of the eight channels as well as the order wire channel are two-way channels between the terminals A and B. Each of the channels may be provided with a transmitting device such as a transmitter 126 and a receiver 127 shown in terminal A and transmitter 166 and receiver 167 at terminal B. These devices are shown connected to channel No. 2 at both the terminals. Consequently the transmission path extends from the transmitter 126 through the terminal equipment at terminal A and repeater equipment to the receiving equipment at terminal B and thence to the receiving device 167. A transmission path likewise extends from the transmitter 166 of terminal B through the system to the receiving device 127 at terminal A.

Similar types of transmitting and receiving devices may be connected to the other channels. The system, however, is capable of transmitting signals between other types of transmitting and receiving devices, such as signals from telegraph instruments, picture transmission devices, photoelectric cells, sound devices as well as vibration controlled devices and other similar types of equipment. As shown in Fig. 1, channel 7 is connected to a multichannel or multiplex teleplex telegraph system 128. This multichannel telegraph system may comprise one or more time division multiplex systems or it may comprise a carrier frequency multiplex telegraph system. Either type of system may provide a large number of two-way telegraph channels between the terminals A and B so that the telegraph instrument 129 may transmit to and receive from corresponding instrument 169 at station B.

Channel 1 is conveniently reserved for synchronizing purposes so that no transmitting or receiving equipment is connected to the terminals of channel 1.

As shown in Fig. 1, the eight channels are connected to a common frame 120 at terminal A and frame 160 at terminal B. The common frame is employed to provide the proper terminations for each of these channels so that they may be connected to any type of communication system including both two-wire and four-wire circuits. These communication circuits may extend to and from suitable types of communication circuits and equipment including open wire and cable toll circuits, carrier current communication circuits, composited telephone and telegraph circuits, carrier current telegraph circuits of both the voice frequency and high frequency types. These connecting circuits may include any or all of the usual types of control and supervisory features, regulating and controlling devices as well as automatic manual and voice operating switching devices, including echo suppressors, gain controls and the like and all of the usual or desirable types of repeating and terminating equipment necessary or desirable for operating these related or connected systems. Inasmuch as all of these other systems operate in their usual manner when cooperating with the exemplary system described herein, their mode of operation will not be further described herein.

From the common frame the signals are transmitted to the transmitting modulator frame 122 at terminal A and 162 at terminal B. Signals are received from the receiving demodulating frame 121 at terminal A and 161 at terminal B. From the transmitting modulating frame 122 signals are shown transmitted through a radio transmitter 131 and antenna and reflector 133 at terminal A. The signals then are received by the receiving antenna 144 at the intermediate relay repeater point and transmitted through the receiving converter 142, radio frame 140 to the repeating amplifier 155 to the radio transmitter 151 and then through the antenna 153 to the receiving antenna 172 and receiving converter 174 at terminal B. From the receiving converter 174 the signals are transmitted through the radio frame 163 to the receiving demodulator 161 and then common frame 160 with the appropriate receiving devices. The transmission path in the reversed direction may be traced from the transmitting modulator frame 162 at station B to the receiving demodulator frame 121 at station A.

It will be apparent to persons skilled in the art that the transmission path from the radio transmitter 131 to the receiving converter 142 for example, may be replaced by a wave guide or other transmitting device or medium. The same is true for each or any of the radio transmission paths shown in the drawing. It is likewise possible that the entire radio portions of the system may be dispensed with and direct communication paths established by means of suitable transmission conductors or devices from the transmitting modulator frame 122 to the receiving modulator frame 161 either directly or through repeater equipment such as indicated at 155 and 145 of Fig. 1.

Persons skilled in the art will readily understand that local conditions as well as various other factors will determine which of the types of transmission systems are employed.

Two bridging units 156 and 146 are shown at the intermediate relay repeater station of Fig. 1, one associated with the amplifier for each direction of communication. These bridging units are provided to permit the attendants at the intermediate repeater stations to communicate with each other and with the terminal stations over the so-called order wire channel. Provision has also been made to permit connections at each of the repeater stations between the communication circuits terminating there and the order wire circuit so that communication may be obtained between circuits terminating at the repeater points and the terminals or between circuits terminating at the various repeater points.

In the exemplary system embodying the present invention, communication between the terminals over the various channels is by means of pulses of short duration occurring in rapid succession. Groups of successive pulses form code groups and the pulses within these groups are arranged to form a permutation code sometimes called a binary code or binary-permutation code, two types of pulses being usually employed. The number of pulses of any code group is fixed but their character is varied in accordance with the information to be transmitted over this system. As in the present system, the two types of pulses frequently take the respective forms of a current pulse and a pulse of no current, i. e. the absence of a current pulse. These pulses are sometimes considered as equivalent to or representative of either a zero or a one in each denominational position or order of a binary number.

Of course persons skilled in the art will readily understand that any two different types of pulses may be employed in such a system and conversion means employed for converting signals of the various types of pulses to signals of the other types.

In the exemplary system described herein five successive pulses form one code group of pulses, the next five successive pulses form another code group, and each succeeding group of five pulses form a succeeding code group. Each pulse of each group of five may comprise a current pulse or a pulse of no current. Each group of pulses is employed to represent an increment of the information transmitted over the system.

Signals from each of the channels are sampled in succession at a high rate which is about twice the frequency of the highest component of the signals to be transmitted over the system. In the exemplary embodiment described herein the signals from each channel are sampled 8,000 times a second. The magnitude of each of the samples is then employed to determine the character of the pulses of each of the five-pulse code groups. In other words a code group of five pulses each of which may be of one or the other of the five different signalling conditions is transmitted representing each sample from each of the channels. This means that, with samples from each of the eight channels being taken at the rate of 8,000 a second, 64,000 samples are taken a second. Each of these samples is represented by five pulses so that 320,000 pulses must be transmitted each second.

A system for modulating and demodulating such multiplex signals is described in the article entitled "Pulse Code Modulation," by H. S. Black and J. O. Edson, Transactions of the American Institute of Electrical Engineers, vol. 66, pages 895–899, 1947.

Due to the characteristics of the ultra-short wave radio generators, transmitters, receivers, transmission paths and the like, it is desirable that the pulses of radio frequency transmitted be of short duration followed by an idle or rest period of relatively longer duration. This permits a favorable duty cycle of operation for the transmitting tubes and thus permits them to be operated at a high instantaneous power and at the same time maintain the average power at relatively low level. In this way the tubes may be operated at a high power level and excessive heating avoided. These and other considerations tend to limit the number of pulses which may be transmitted in any given interval of time.

However, when it is desirable to provide still additional communication paths or channels over such a system, it is possible to time-modulate the pulses by changing their time of transmission in accordance with still other signals to be transmitted over the system. Systems of this type are sometimes called "time modulation" systems or alternatively, "position modulation" systems. In accordance with the present invention the order wire signals are transmitted in this manner. In other words the entire array of coded pulses representing the communication over all of the eight channels is time or position-modulated in accordance with the signals to be transmitted over the order wire. In other words, the time of transmission of the coded pulses when they are present is varied in accordance with the signals to be transmitted over the order wire.

It will be at once evident that it is necessary to limit the amount of time or position modulation applied to these pulses so that one pulse will not be shifted into the time assigned to another pulse. When the shifting of pulses in time is so limited, there need be no interference or cross talk between the time-modulated signals and the coded pulses representing the signals being transmitted over the eight channels, 1 to 8.

The various features of the object of this invention may be more readily understood from a detailed description of the equipment and intermediate relay repeater point and, in particular, from a detailed description of the repeating amplifiers 155 and 145 shown in Fig. 1. These devices will be described hereinafter in greater detail.

The radio transmission paths including the radio transmitters and antennas, radio receiving converters and the various radio frames such as 123, 140, 150 and 163 indicated in Fig. 1 are described in the technical manual TM–11–631 on the Radio Transmitting Set AN/TRC–6. Inasmuch as the other circuits of this invention are arranged to cooperate with these radio channels without alteration therein and inasmuch as this radio equipment and channels operate in combination with the other circuits and apparatus of the exemplary system described herein in their usual manner, the details of this equipment together with the detailed description of its operation has not been repeated herein. The above-identified manual is hereby incorporated by reference and made a part of this specification as if set forth in full herein.

Figure 2:
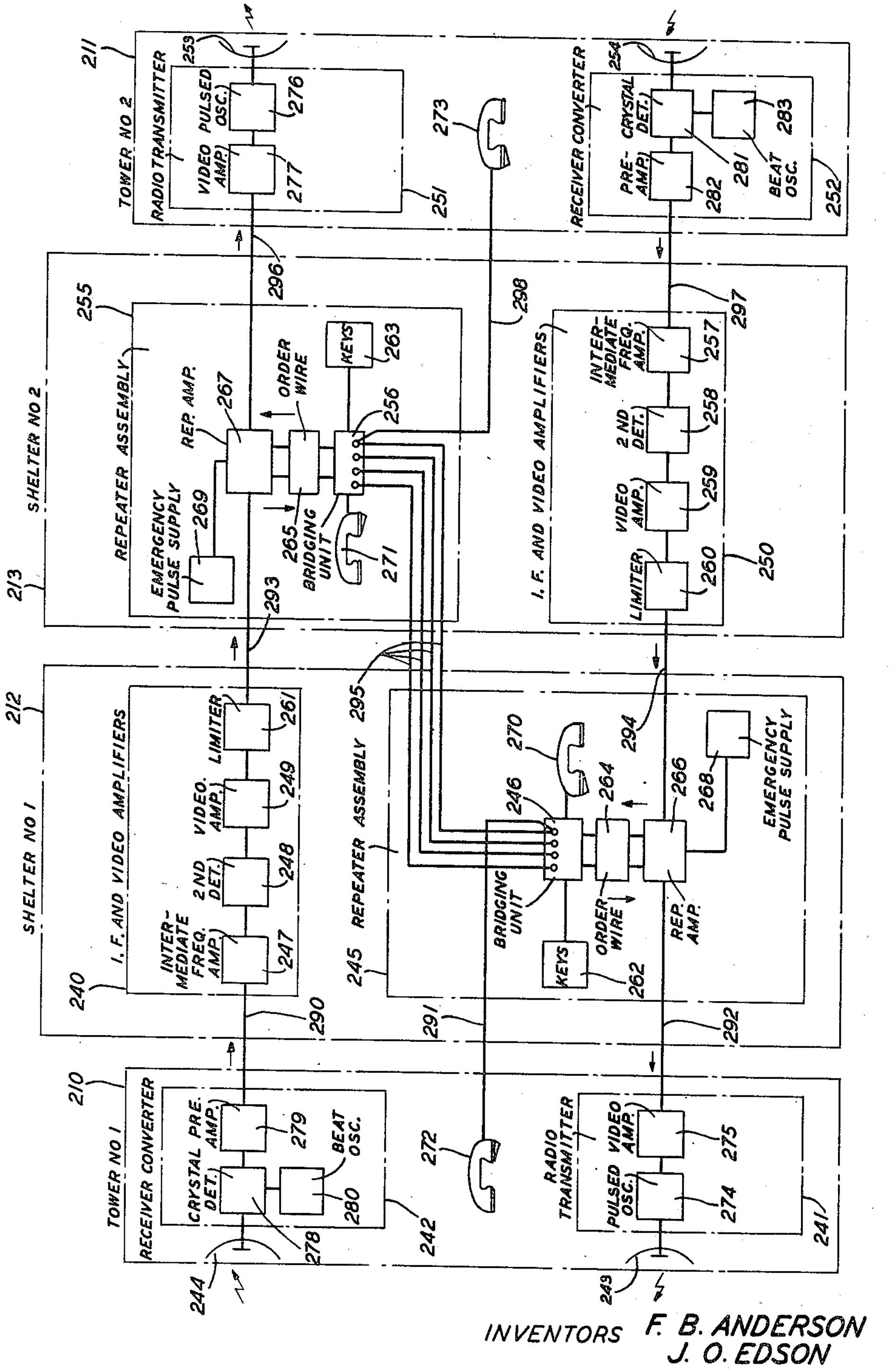
Fig. 2 shows in greater detail various circuits in the apparatus located at each intermediate relay repeater station.

Fig. 2 shows in outline form the various elements located at a typical repeater relay station between the terminal stations as shown in Fig. 1. Fig. 2 also shows the various elements of the radio transmitting and receiving equipment and the manner in which they are interconnected with the various elements of the typical repeaters embodying the present invention.

While the details of the radio portions of the repeater equipment are described in detail in the above-identified War Department publication, they have nevertheless been shown in outline form in Fig. 2 in order that the manner in which they cooperate with various elements of the present invention may be more readily understood.

In Fig. 2 the antenna and reflector system 244 receives radio waves from the left and transmits these signals to a receiver converter 242. This converter comprises a crystal detector 278, beating oscillator 280 and a preamplifier 279. The receiver converter is employed to reduce the frequency of the incoming signals from frequencies employed on the radio path, which may be in the microwave region to a lower intermediate frequency. The receiver converter equipment in the exemplary system described in the above-identified technical manual in all located upon the radio tower.

The intermediate frequencies from the receiving converter are then transmitted from the tower by means of a cable or conductor 290 to intermediate frequency and video amplifier 240, which comprises an intermediate frequency amplifier 247, a second detector circuit 248, a video amplifier 249 and an amplitude limiting device 261. The signals are then delivered from the intermediate and video amplifier 240 to the repeater assembly 255, where the signals are reformed, and when desired are positioned in time, and then transmitted over another cable or conductor 296 to radio transmitter 251 located on another radio tower. The radio transmitter comprises a video amplifier 277 and the pulsed radio frequency oscillator 276. The radio signals are then radiated from the antenna and reflecting structure 253 to the next repeater station or to the terminal station. A similar arrangement is provided for the transmission of signals in the opposite direction, the signals being received by the antenna and reflecting structure 254 and retransmitted from the antenna 243.

It will readily be understood that it is not necessary to arrange or distribute the equipment in the manner shown in Fig. 2 between the various receivers, converters, amplifiers, repeaters and transmitters because any other suitable or desirable arrangements may be employed in systems embodying this invention. However, the arrangement shown in Fig. 2 provides a satisfactory and convenient way of separating the equipment and locating it where it may be used to good advantage.

As shown in Fig. 2 the repeating amplifiers 267 and 266 are provided with emergency pulse supplies 269 and 268, respectively, order wire equipment including keys 263 and 262, bridging units 265 and 264, and telephone sets 271 and 270 are connected by means of cable 295. An arrangement has been made for providing an additional telephone set 272, 273 at each of the radio towers to enable the attendants and service personnel to more readily and more accurately adjust the equipment at these positions.

*Reforming and repeating received signals*

Turning now to the detailed operation of the system as shown in Figs. 4 through 9 when arranged as shown in Fig. 10, the radio signals are received by the antenna and reflecting structure 444 and transmitted through the crystal detector 478 where they are combined with currents from the beating oscillator 480 and thus reduced in frequency and then transmitted through the preamplifier 479, all of which equipment is located on tower 410. The intermediate frequency is then transmitted over cable or conductor 490 to the intermediate frequency and video amplifier 440 comprising the intermediate frequency amplifier 447, second detector 448, video amplifier 449 and limiter 461. The signals are then transmitted over conductor or cable 493 to the amplifying equipment shown in Figs. 5, 6, 7 and 8.

As pointed out above, these signals comprise pulses of short duration, which represent the information being transmitted over the system. As pointed out above, the pulses are arranged in pulse code groups, each group comprising five pulses or five pulse positions. Each of the pulses may comprise either one or the other of two different signaling conditions, or stated another way, one or the other of two different types of pulses is transmitted in each of the pulse positions of the code combination. In the exemplary system described in detail herein, the signaling conditions comprise pulses of current or no-current or the pulses may be considered to be pulses of current or pulses of no-current. Another way of describing the pulses employed herein is to say that certain pulses are present and others are absent. Persons skilled in the art, however, will readily understand that pulses of different polarities or different amplitudes or of other different types of signaling conditions may be employed, because the invention is not limited to any particular type of pulses or signaling conditions. The pulses transmitted over cable or conductor 493 are assumed to be pulses of positive current of short duration or pulses of no-current in each one of the pulse positions. As pointed out above, such an array of pulses is arranged to transmit the information or intelligence of eight voice frequency communication channels. This information may be in the form of voice currents or voice frequency telegraph carrier currents, picture transmission currents and other alternating or varying currents having substantially the same frequency range or frequency components.

Furthermore, as pointed out above, these pulses may be time-modulated in accordance with an additional or order wire circuit in a manner to be described hereinafter.

However, for purposes of description and illustration, it is to be first assumed that an array of pulses is being received which is not time-modulated. Thereafter the operation of the system in time modulating these pulses and in demodulating them will be described.

Assume first for purposes of illustration that a group of pulses such as illustrated by lines 1110 of Fig. 11 is received over conductor 493. These positive pulses are applied to the grid of tube 510 in Fig. 5 through the coupling condenser 521. Grid bias resistor 512 extends to positive bus bar 530. Bus bar 530 is positive with respect to negative bus bar 531, to which the cathode of tube 510 is connected. However, in the exemplary system disclosed herein bus bar 531 is approximately 350-volts negative with respect to ground and bus bar 530 is negative 180-volts with respect to ground. Bus bar 532 is connected to ground through a low resistance comprising resistor 741 and consequently is about 5-volts negative with respect to ground. This 5-volt potential with respect to ground is employed to energize the transmitters of the telephone sets as will be described hereinafter. Bus bars 530 and 532 are shown respectively, by dot-dot-dash and dot-dash lines in the drawings, so that they may be readily recognized. Voltages referred to as positive or negative herein are usually positive or negative with respect to the cathode of the corresponding tube.

Tube 510 like many other tubes of this system has applied to its grid voltages which cause the grid to become slightly positive with respect to the cathode for a portion of the time. Use is made of these time intervals to cause the rectification by the grid to create the necessary grid bias and thus maintain the grid at proper biasing potential. This biasing potential normally maintains the anode current of tube 510 cut-off. The grid of tube 513 is directly coupled to the anode of tube 510 and through the anode resistor 511 to bus bar 530. Thus, the grid of tube 513 is maintained slightly positive with respect to its cathode. The resultant grid current is limited by relatively high anode resistor 511 of tube 510, so that the grid of tube 513 can become only slightly more positive than the cathode of tube 513.

Upon the application of a positive pulse to the grid of tube 510, anode current will flow through tube 510 to cause the anode potential of tube 510 to be reduced to a low value near the potential of the cathode of tube 510 substantially independent of the magnitude of the incoming pulses over a wide range. As the anode of tube 510 falls to this low value its capacity including the capacity of the grid of tube 513 to ground as well as the distributed capacity to ground of the wiring interconnecting these elements is discharged. At the same time the anode current of tube 513 is decreased, thus causing the potential of the anode of tube 513 to rise and start a pulse of positive potential in the output circuit of tube 513.

Upon termination of the positive pulse applied to the grid of tube 510 the anode current of tube 510 is again cut off and the capacity of the anode of tube 510 and the grid of tube 513 to ground, as well as the distributed capacity to ground of the leads interconnecting these elements starts to charge through the high resistance 511. This charging action stops when the grid of tube 513 becomes positive to its cathode and draws grid current. The time constant of these capacities with resistance 511 is such that it requires an appreciable time, of the order of a microsecond in one specific system, for the grid of tube 513 to again reach its initial positive condition, at which time the transmission of the first pulse in the output circuit of this tube is completed. It is thus evident that the pulse has been lengthened by the charging time of the stray capacities at the junction of the anode and grid of tubes 510 and 513 respectively.

The above operation is repeated for each of the pulses which are correspondingly lengthened. Graph 1112 of Fig. 11 shows the manner in which the potential of the anode of tube 510 and grid of tube 513 varies in response to each of the received pulses. The graph 1114 shows the manner in which the anode potential of tube 513 correspondingly varies. The pulses 1114 are shown with perpendicular sides and square corners. Persons skilled in the art will understand, however, that this showing is illustrative because the corners are actually somewhat rounded and the sides of the pulses are usually somewhat inclined. For the purpose of illustration these pulses are shown in a simplified form in graph 1114.

As shown by graphs 1112 and 1114, when the potential of the anode of tube 510 and of the grid of tube 513 again is restored to its initial condition the pulse 1114 is off. As illustrated by the length 1115 of Fig. 11 each of the pulses has been appreciably lengthened in time over the pulses 1110 received from the radio system. The inductance 514 and resistor 520 forming the output impedance of tube 513 are so chosen as to compensate in part at least for the capacity of the anode circuit of tube 513 and the distributed capacity of the associated wiring, so that the shape of the pulses is materially improved and made to approach the simplified forms shown by graph 1114 of Fig. 11.

The pulses from the output or anode circuit of tube 513 are applied to the grid of tube 515, which tends to amplify these pulses and invert them. The output circuit of tube 515, however, is provided with an inductance 516 and resistance 523, which have values so chosen that they serve to differentiate the pulses applied to the grid of tube 515. In other words, upon the beginning of the positive pulse applied to the grid of tube 515 a very sharp negative pulse of short duration is generated in the output circuit of tube 515 and upon the termination of the positive pulse applied to the grid of tube 515 a sharp positive pulse of short duration is generated in the output circuit of tube 515. The negative pulses are illustrated by lines 1117 and the positive pulses by lines 1116 of Fig. 11. These pulses are then applied to the grid of tube 517, which is arranged similarly to tube 510 except the grid is returned to the cathode. Inasmuch as this tube is normally maintained non-conducting by means of the bias potential applied to and developed by the elements of this tube, the negative pulses 1117 applied to the input of tube 517 from the output circuit of tube 515 produce substantially no effect. The positive pulses, however, are repeated as will be described hereinafter.

Thus, tubes 510, 513 and 515 serve first to lengthen the received pulses and then to select the trailing edge of these pulses for transmission to the succeeding tubes. It has been found that such an arrangement is highly desirable, first because the time of termination of the received pulses has been found to be more consistent, more reliable and more accurate than that of the leading edge and thus causes less noise in the system. In the second place, when the pulses are of extremely short duration as in the exemplary system described herein, wherein the pulses may be of the order of $\frac{3}{10}$ to possibly $\frac{7}{10}$ of a microsecond it has been found that transients arising at the two edges of the pulses are apt to interfere one with the other. By lengthening these pulses in the manner described above, the two edges of the pulses may be sufficiently separated so that they do not interact with each other appreciably.

By first separating the two edges of the pulses and then employing the trailing edge for further control purposes, applicants are enabled to provide a superior communication path subject to less noise and providing greater fidelity of transmission thereover.

Tubes 517 and 619 operate in a manner similar to tubes 510 and 513. In other words, they are employed to lengthen the very short pulses 1116 to any desired pulse length.

In the specific embodiment described herein, tubes 517 and 619 are employed to lengthen the pulses 1116 to about 1½ microseconds' duration. This pulse length is substantially half the pulse interval assigned to each pulse. In other words, when the pulses are present they occupy substantially half the pulse interval time. Such an arrangement is provided because pulses of substantially half-pulse interval duration have been found to be most suitable for controlling an oscillator in a manner to be described hereinafter.

In addition, by providing a second pair of tubes 517 and 619 similar to tubes 510 and 513, and controlling these tubes 517 and 619 by the differentiated trailing edges of the pulses from tube 513, each of the pulses will have substantially the same duration, independent of the duration of the received pulses.

As pointed out above, the received pulses are first lengthened by tubes 510 and 513. The duration of these lengthened pulses 1114, however, is a function of the time interval added to the pulses and also the duration of the received pulses. Thus, the length of duration of the pulses 1114 varies appreciably with the variation of the duration of the received pulses. Such variation has been found to add noise to the order wire circuit, and to overcome this variation the pair of tubes 517 and 619 operating in the above-described manner has been used. Under these circumstances the pulses generated in the output circuit of tube 619 are of uniform duration and occur at a time controlled by the trailing edge of the received pulses 1110.

The wave form of the potential of the anode of tube 517 and the grid of tube 619 is shown by the solid line 1118 of Fig. 11, while the shape of the lengthened 1½ microsecond pulses generated in the anode circuit of tube 619 are illustrated by the solid line 1119 of Fig. 11.

The output of tube 619 is amplified by tube 622 and short pulses produced in the plate circuit 623 in the same manner as described above with reference to tube 515. These pulses are illustrated by lines 1120 in Fig. 11. The negative pulses are suppressed and the positive pulses 1120 control tubes 624 and 626 in the same manner that the input pulses control tubes 510 and 513. In other words, the positive pulses applied to the grid of tube 624 cause the capacity of the anode of tube 624 and of the grid of tube 626 to ground as well as the capacity of the interconnecting wires to ground to be discharged and at the termination of the pulse to be recharged through the high resistance 625. A graph of the potential of the anode of tube 624 and the grid of tube 626 is illustrated by the solid line 1121 of Fig. 11. The output of tube 626 is then in the form of short pulses approaching that illustrated by lines 1122 of Fig. 11. The duration of these pulses is dependent upon the charging time of the capacity including the distributed capacity mentioned above. The pulses are then transmitted through tubes 628, 729 and 730, which amplify and further shape and limit the pulses so that they approach the form illustrated by line 1122 of Fig. 11. Tube 730 operates as a so-called cathode follower transmitting signals over the conductor or coaxial cable 733 extending to the radio transmitter 951, which emits the signals for the next repeater station or the terminal. The amplifying and shaping tubes 628 and 729 operate as overloaded amplifier tubes and tend either to be cut off or to be saturated and thus tend to clip or limit the pulses and in this way improve their wave shape.

Thus the pulses received from the receiving radio amplifier are first lengthened and then their trailing edges employed to generate additional pulses of uniform duration, the trailing ends of which are accurately controlled from the trailing edges of the pulses as received. The trailing edges are then employed to generate still other pulses of short duration suitable for controlling the radio transmitter for retransmitting the signals toward the receiving terminal of the system, either directly or through other intermediate relay repeater points with equipment similar to that described above. The trailing edges of the final pulses after being formed and suitably shaped are still accurately controlled by the trailing edges of the received pulses so that the time relation between the received pulses is accurately maintained between the various pulses transmitted.

It should be noted that the time delay or charging time of the distributed capacities associated with the grid circuits of tubes 513, 619 and 626 is shown to be different in the graphs 1112, 1118 and 1121 of Fig. 11. This difference in times is obtained by varying the total amount of the change in charge of this capacity in response to each of the individual pulses. This change in charging time is effected by changing the cathode potentials of the respective tubes 513, 619 and 626 and the value of resistors 511, 518 and 625. As shown in Fig. 11, the charging time for the capacities associated with the grid circuit of tube 619 is the longest. To secure this longer charging time the change in charge and thus the change in voltage across this capacity is made greatest. In other words, the cathode of tube 619 is maintained at the highest positive potential of the three tubes 513, 619 and 626 with respect to the bus bar 531. When, as shown by graphs 1121 and 1122 of Fig. 11, it is desirable to have the output pulses of very short duration the change in charge and thus the change in voltage acros the respective capacities is correspondingly reduced to a minimum by reduction of the grid-cathode bias on tube 626 by reducing variable resistor 662. Similar adjustment is afforded for the pulse output from tube 619 by means of its variable cathode resistor 621. Consequently, the bias potential of the cathode of tube 626 is reduced to a low value so that the charging time of the distributed capacity of the anode circuit of this tube approaches a minimum and is of the desired duration.

When i tis desirable to have the delay or lengthening of the input pulses intermediate between the two values afforded by tubes 619 and 626, the cathode of tube 513 is fixed at a voltage intermediate between the voltage of the cathodes of tubes 619 and 626. However, it should be noted that even though the charging time differs between the different tubes the charging time of the capacity of each of the tubes is substantially the same in response to each of the pulses received.

*Time or position modulation*

In the foregoing description it has been assumed that the pulses as received were not time-modulated, either as received or by any equipment at the repeater point. In other words, the cathode potentials of tubes 513, 619 and 626 are maintained at a substantially fixed average value.

However, it is possible to time-modulate the entire array of pulses received in accordance with signals applied to this system at the intermediate repeater point. Assume, for example, that speech signals are applied to conductors 710 from the bridging unit in a manner to be described hereinafter. These speech signals are transmitted through the input transformer 610 and applied to the grid of amplifier tube 611. The gain of the amplifier tube 611 is varied in a manner to be described hereinafter. The output of tube 611 is further amplified by tube 616. The output circuit or anode of tube 616 is connected to the cathode of tube 619 at the common terminal of resistor 642 and the cathode resistor 621. Thus the potential of the cathode of tube 619 is caused to vary in accordance with or under control of the voice frequency or other type of signaling currents applied to conductors 710. If these signals are of such a polarity as to make the potential of the cathode of tube 619 more positive, they will cause the pulses appearing in the plate circuit of this tube to be lengthened, whereas if the signals applied to conductor 710 are of such a polarity as to make the cathode potential of tube 619 less positive, they will cause a corresponding shortening of the pulses appearing in the anode circuit of tube 619. This is due to the fact that the length of the pulses is determined by the time of charging of the stray capacities at the junction of the anode of tube 517 and the grid of tube 619. This charging is terminated when the grid of tube 619 rises above the plate current cut-off point and becomes positive to the cathode so that the resultant flow of grid current stops the charging.

The pulses appearing in the anode circuit of tube 619 when the potential of the cathode of tube 619 is raised are illustrated by the dotted graph 1123. When the potential of the cathode of tube 619 is reduced below the mean value the pulses in its anode circuit are illustrated by the dotted line 1124.

It should be noted that in order to prevent distortion, it is desirable that the potential applied to the grid of tube 619 should vary linearly with time during the recharging of the capacity of the anode of tube 517 and of the grid of tube 619 as well as the capacity of the interconnected wiring. In the exemplary system disclosed herein, this substantially linear relationship is obtained by using only a small portion of the usual exponential charging relationship by limiting the amount of change of charge by grid conducting of the succeeding tube 619 as described above, so that the portion of the exponential curve actually employed does not depart materially from a straight line.

The variation in length of the pulses generated in the anode circuit of tube 619 is shown by the dotted curves 1125 of Fig. 11. As shown in Fig. 11, the dotted lines are displaced by an equal amount on each side of the trailing edge of the pulses 1119. These dotted lines are intended to illustrate a suitable range for the variation in the length of the pulses 1119. Persons skilled in the art will readily understand that the pulses may actually terminate in places between these dotted lines and that successive pulses do not necessarily terminate at the same relative time or position between these dotted lines, but will vary in accordance with the speech or other signals applied to conductor 710. The variation in the length of the pulses 1119 causes a variation in time of occurrence of the sharp positive pulses generated in the anode circuit of tube 622 and in turn causes a variation in the actual time of transmission of the pulses. The dotted lines 1126, 1127 and 1128 of Fig. 11 show one position in the range of variation of the various pulses or wave forms when the entire array of pulses is time or positioned modulated.

It is thus apparent that when signals are impressed upon the conductors 710 at the intermediate repeater point, the time of transmission of the individual pulses is modified in accordance with these signals. Consequently, the transmitted pulses while still corresponding in character to the received pulses will have their times of transmission relative to the incoming pulses modified in accordance with the signals applied to the conductors 710.

It should be noted that only the particular pulses received are retransmitted. If no pulse or a pulse of no current is received during any pulse interval, no pulse will be transmitted during the corresponding interval by the repeater and radio equipment. Consequently, the signaling conditions of the received pulses and thus the specific code combinations of the pulses are not altered or changed by any of the signals applied to the conductor 710. It is thus apparent that the time modulation of the coded pulses will cause no crosstalk between that channel and the pulse code channels so that each may convey the proper information without interference one with the other.

As described above the pulses in the output circuit of tube 619 are of uniform length except when locally modulated and are independent of the length of the received pulses. These pulses, however, occur at times which are accurately controlled by the trailing edges of the received pulses. These pulses are present or absent in the various pulse positions in accordance with the received pulses, that is, the pulses are of either current or no current depending on whether or not the received pulses are of current or no current.

The pulses in the output circuit of tube 619 are applied to the input circuit of tube 617. Tube 617 amplifies the pulses and applies them to a resonant circuit connected to its anode.

The resonant circuit comprises an inductance 612 and condensers 613 and 614. The resonant circuit is designed to have a low loss and thus a high Q so that an oscillating current of the resonant frequency will flow in this resonant circuit in response to the application of pulses to it. In other words, the oscillating current continues to flow through this circuit during periods when no pulses or pulses of no current are applied to it.

In an exemplary system embodying the present invention this oscillating circuit is tuned to a frequency of 320 kilocycles. The pulses applied to it from the plate circuit of tube 619 are substantially one and one-half microseconds long. In other words, the length of these pulses is substantially a half cycle of the oscillating current. The resonant circuit comprising inductance 612 and condensers 613 and 614, in addition to being tuned to resonate at the pulse frequency of 320 kilocycles per second, is designed so that the oscillating current flowing in it decreases only to approximately 90 percent of its average value in the absence of thirty consecutive pulses. The absence of thirty consecutive pulses will occur only very rarely. Thus, it is apparent that whether or not pulses are received in a random fashion in accordance with the information being conveyed by them a continuously oscillating current is maintained in the resonant circuit in the plate of tube 617. This continuously oscillating current will vary in magnitude slightly depending upon the number of pulses received from instant to instant, but such variations will be of small magnitude. It is further evident that the frequency of occurrence and the phase of the oscillating current flowing in this resonant circuit will be accordingly controlled by the time of occurrence of pulses applied to it.

A portion of the potential developed across the oscillating circuit is applied to the grid of tube 618. The output of tube 618 is in turn applied to the input of tube 519. The resistor 615 connected to the grid of tube 618 and the resistor 629 connected to the grid of tube 519 tend to cut off or clip positive parts of the pulses applied to the grids of the respective tubes when grid current starts to flow. The potentials applied to these grids tend to drive the grids negative beyond the plate current cut off of the tubes. Thus, both tubes 618 and 519 operate as limiting amplifiers to limit the amplitude variations of the pulses both on their positive peaks and on their negative peaks. Thus tubes 618 and 519 substantially reduce the amplitude variation of the oscillating voltage transmitted through them. These tubes thus change the wave shapes of this voltage from a substantially sine wave to a substantially square wave.

The output of tube 519 is applied to the grid of tube 524. Tubes 524 and 537 comprise a crystal controlled oscillator operating at a frequency which is the same as that of the resonant circuit 612, 613, 614. The oscillator tubes 524 and 537 oscillate at a frequency which is accurately controlled by the piezoelectric crystal 529. Crystal 529 is preferably a quartz crystal having a low temperature coefficient of frequency.

As is usual where a high degree of stability is desired, crystal 529 is mounted in a constant temperature oven 533. In constant temperature oven 533 power is supplied from the source of power 536 through switch 535. A pilot lamp 534 is provided to indicate when the power is applied to the constant temperature oven.

A small condenser 528 is connected in series with the crystal circuit and serves as a final frequency adjustment for making small changes in the frequency thereof.

The oscillator tubes 524 and 537 together with the crystal 529 are connected in an oscillating circuit of a known type. The grid of tube 524 is connected to the output of tube 519 so that the frequency and phase of the oscillating current flowing in the oscillator circuit will be maintained at a frequency which is accurately controlled by the received pulses.

The potential applied to the grid of tube 524 is amplified by tube 524 and the output is branched to two circuits. One branch of the output circuit of tube 524 is obtained by means of a potentiometer comprising condensers 527 and the resistance potentiometer 526. Potentiometer 526 serves as a volume control for the demodulated output. The output from the potentiometer 526 then flows through a phase delay network 631 as will be described hereinafter. The current flowing in this path to the phase delay network 631 follows substantially the phase or time of occurrence of the pulses on the grid of tube 524. In other words, the phase of this current varies under control of the time of occurrence of the pulses received by the repeater from the radio system.

Another branch of the output of tube 524 leads to quartz crystal 529 and then to the grid of the left-hand section of tube 632. Due to the low damping or high Q of piezo-electric crystal 529, the phase of the currents flowing through this crystal will not vary appreciably with the time of occurrence of the received pulses. Instead, the current flowing through the crystal will tend to remain at an average phase with respect to the phase variations on the grid of tube 524. Thus the phase of the 320 kilocycle current flowing through the crystal 329 is controlled in accordance with the average relative time of occurrence of the received pulses instead of the actual time of occurrence of the individual pulses as is the case with the currents flowing through the delay network 631.

Thus the output currents from the crystal 529 serve as reference currents. These currents are applied to the grid of the left-hand section of tube 632. The currents from potentiometer 526 have a phase controlled by the relative time of occurrence of the received pulses and are applied to the grid of the right-hand section of tube 632. The two currents due to the right and left-hand grid voltages of tube 632 are combined in the common anode resistor 648.

Fig. 12 shows a vector diagram of the phase relation between these currents. In Fig. 12 the vector 1201 represents the phase of reference current which passes through the piezoelectric crystal 529. The vector 1202 represents the current which varies in phase in accordance with the received pulses. The solid line 1202 represents the mean position of this vector which, due to the action of the delay network 631, is delayed by a phase angle of approximately 135 degrees. The dotted lines 1203 and 1204 are intended to indicate the excursions of vector 1202 in phase due to the variation in time of arrival of the received pulses. It is thus evident that the sum of vectors 1201 and 1202 varies in amplitude by an amount represented by the segment 1205.

Thus the sum of these two currents flowing in resistor 648 of the combined output circuits of both sections of tube 632 varies in amplitude depending upon the phase variation of the oscillating current in the resonant circuit comprising inductance 612 and condensers 613 and 614. The left-hand section of tube 633 to which the output of tube 632 is applied operates as an infinite impedance detector. The output currents over lead 634 thus form a demodulated output current.

Assuming first that as assumed above the received signals do not vary one from another in time or position then the pulses in the output circuit of tube 619 will all be regularly spaced one from another, assuming, of course, that they are all present. Where pulses are absent the space normally occupied by a current pulse will have a pulse of no current, whereas at a succeeding pulse time interval if the pulse is present it will be present at an accurately assigned time. Under these circumstances the phase of the oscillating current flowing in the output of tube 617 will not vary materially, since the tuned circuit is oscillating at substantially the same frequency as that of the incoming pulses. Thus the phase of this oscillating current will remain constant with respect to the current derived from the tcrystal 529. Consequently the amplitude of the current in the resistor 648 will remain constant, and no output current will flow over conductor 634.

However, when the relative times of occurrence of the several received pulses varies in accordance with signals to be transmitted the time of occurrence of the one and one-half microsecond pulses applied to the resonant circuit in the output of tube 617 also varies. In other words these pulses will arrive first with a phase angle which is ahead of the oscillating current in the resonant circuit and then at a time which is behind the phase of the oscillating current. These pulses thus act to alter the phase of this oscillating current, tending to make it advance at times and at other times tending to retard it. This phase modulated signal is then amplified as described above and delayed by network 631 and then combined with the reference current the phase of which does not substantially vary and causes an amplitude modulated potential to appear across the common anode resistor 648. The original signal currents are recovered by detection in the left-hand section of tube 632 and flow over conductor 634.

These currents are then amplified by the left-hand section of tube 717 and then pass through the low-pass filter 711 which removes substantially all the high frequency components which are not part of the original modulating signaling currents. The output of the filter 711 passes through transformer 712 and then through attenuation pad 713 and over the transmission path 715.

*Volume control to prevent over-modulation*

The output of filter 711 is also connected through a coupling capacitor 716 to the right-hand section of tube 635. The plate and grid of the right-hand section of tube 635 are tied or connected together so that this section operates as a diode rectifier. When signals are applied to the plate and grid of this tube through the coupling capacitor 716, a negative voltage is developed across resistor 636.

A portion of the negative voltage developed across resistor 636 is supplied to the grid of the left-hand section of tube 635 through resistor 660. Condenser 637 and resistor 660 act as an integrating or filtering device so that the grid of the left-hand section of tube 635 does not follow the instantaneous speech wave output from filter 711. Instead, the grid of the left-hand section of tube 635 is maintained at a potential which is an average of the amplitude of the speech wave output from filter 711. In other words, the higher the average amplitude of the speech wave from filter 711 the more negative the grid of the left-hand section of tube 635 will be maintained.

The anode of the left-hand section of tube 635 is connected to the grid of the right-hand section of amplifying tube 633 and the output of this section of tube 633 is connected to the screen of tube 611.

The more negative the potential applied to the grid of the left-hand section of tube 635 the higher will be the positive potential applied to the grid of the right-hand section of tube 633. The greater the positive voltage of the right-hand section of the tube 633 the greater will be the current flowing in the anode-cathode circuit of this section, consequently, the greater will be the voltage drop across anode resistor 639 and, thus, the lower will be the anode potential of this section of tube 633 and the screen potential of tube 611. Thus, as the average output level from filter 711 increases, the positive potential of the screen of tube 611 decreases, thus decreasing the amplification of this tube. Consequently, the incoming speech waves from line 710 are amplified less by tube 611 when a high level of speech wave appears at the output from filter 711. Conversely, the incoming speech waves on line 710 are amplified more when the level of speech wave output of filter 711 is low. As described above, the output of tube 611 after being amplified by tube 616 is employed to control the potential of the cathode of tube 619, and, thus, the time modulation of the transmitted pulses. As described above, the output of filter 711 is derived from the time modulation of the entire array of pulses so that the magnitude of the output current from this filter is a function of the displacement or time modulation of the pulses. Thus the amount of modulation already present controls the gain of the amplifier tube 611, and thus effectively limits the total amount of modulation or displacement of the pulses so that none of the pulses can be displaced or modulated to such an extent that it occupies a place normally assigned to either the preceding or succeeding pulse. In this manner over-modulation of the entire array is prevented.

*Repeater bridging*

Figure 8:
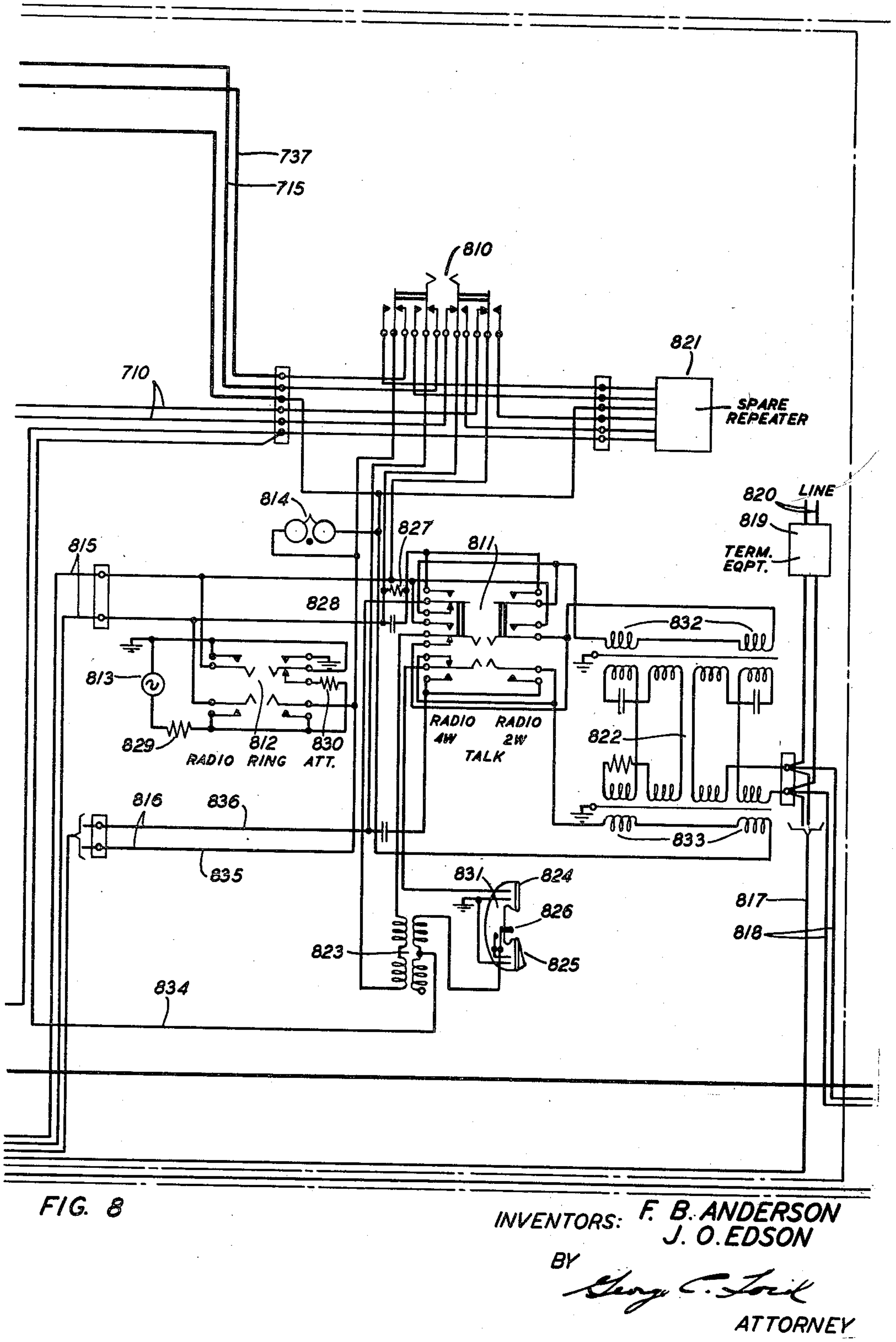
Figure 9:
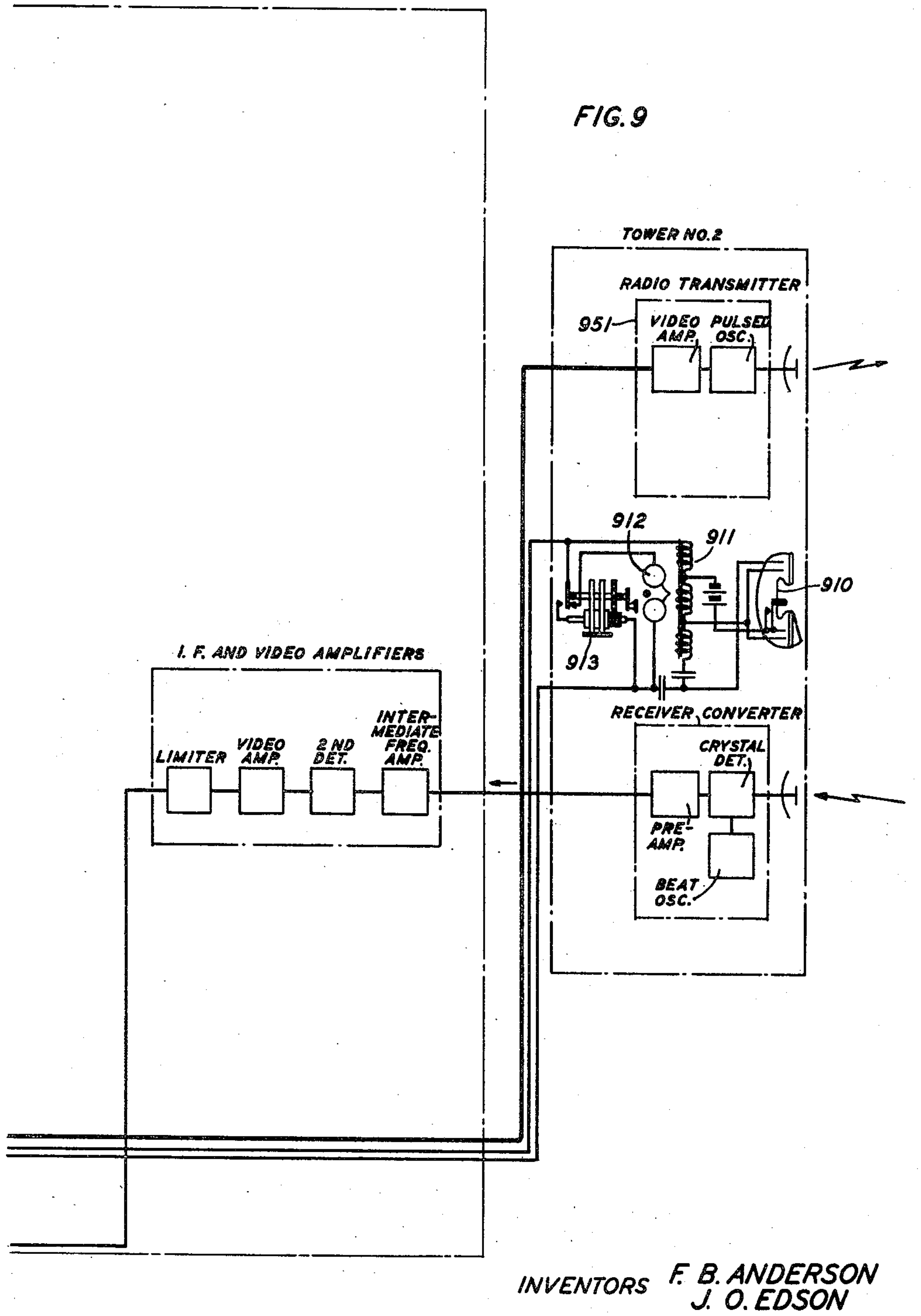

The transmission paths 715 and 710 extend to a repeater bridging unit, details of which are shown in Fig. 8. These provide a path through key 810 which is employed to switch from the repeater circuits shown in Figs. 5, 6 and 7 to a similar spare repeater represented by rectangle 821 of Fig. 8. With the key 810 in the normal position as shown in Fig. 8, the so-called order wire circuit comprising the transmission paths 715 and 710 is connected to the switching, ringing and terminating equipment shown in the lower portion of Fig. 8. With key 810 operated, similar circuits from the spare repeater 821 would be similarly connected to the terminating and switching equipment.

The terminating and switching equipment, shown in the lower portion of Fig. 8, comprises talking key 811, ringing key 812, bell or buzzer 814, a hybrid coil 822, a handset 831 comprising receiver 824 and transmitter 825 as well as a transformer 823, connection to a source of ringing current 813 and also connections to the bridging unit 446 of repeater 445 employed for repeating signals transmitted in the opposite direction. The repeater equipment 445 may be, but usually will not be, located in the same building or shelter as the equipment shown in Figs. 5 through 8, inclusive. Consequently, it is desirable to provide local communication between these repeaters. In order to provide the desired communication a number of transmission and signaling paths extend between the two bridging units. A two-wire two-way path 817 extends between the two units. Likewise, a talking and ringing circuit 815 and a listening circuit 816 also extend between these units. The two-wire transmission path may also be extended over conductors 818 to a telephone set located on the tower and comprising a handset 910, induction coil 911, a ringer 912 and a ringing generator 913.

The two-way two-wire communication path 817 may also extend through any other terminating and switching equipment and over a communication line 820 to any desired terminal equipment. Line 820 may be any land wire, carrier current channel, toll line, communication path, trunk circuit, or similar circuit of another system similar to the one described herein.

With the keys 811 and 812 in their normal position.

as shown in the drawing, a two-way communication circuit extends between the handset 831 through the hybrid coil 22 over the two-wire two-way circuit 817 to any location to which this circuit extends. Signals received over this circuit from handset 910 of the tower, or from a telephone set over line 820, or from the handset 472 of the opposite tower or handset 470 of the other bridging unit are all transmitted through the hybrid coil 822. The hybrid coil is so arranged that these signals tend to balance out in windings 832 but are added together in windings 833. Consequently, these currents will then flow from windings 833 and the left-hand lower break contacts of key 811 to ground through the receiver 824 of handset 831. Likewise, when it is desired to communicate from transmitter 825 the transmitter key or button 826 is operated. Operation of key 826 completes the circuit through the transmitter 825 from ground through transmitter 825, the operated key 826, the primary of transformer 823, conductor 834, switch 740 which is closed, to ground through resistor 741. The current flowing through resistor 741, due to the operation of the tubes and equipment of the repeater shown in Figs. 5 through 7, inclusive, produces a sufficient voltage drop through resistor 741 to supply the transmitter 825 with current.

The signals transmitted from transmitter 825 then pass through transformer 823, the upper and central set of left-hand break contacts of key 811, to windings 832 of hybrid coil 822. The hybrid coil 822 is so arranged that these signals tend to cancel out in windings 833 but are transmitted over each of the lines 817, 818 and 820 which may be connected. It is also possible for the attendant to ring the attendant at the other repeater by operating the ringing key so that the right-hand contacts thereof are operated. Operation of this key then applies the full ringing voltage from source 813 through the resistor 829 to the signaling conductor 835 extending to the other bridging unit. Application of ringing current to this conductor causes the ringer 814 to be operated as well as the corresponding ringer associated with the bridging unit 446. In a similar manner, the attendant at the other bridging unit may cause ringing current to be applied to conductor 835 and thus operate the ringer 814.

It is also possible to talk over the order wire or radio circuit on either a four-wire or two-wire basis. Usually transmission on a four-wire basis will be sufficient. That is, the transmitter 825 is connected to both transmission paths through the two repeaters and the receiver 824 is connected through the repeaters to the two receiving paths without in any way interconnecting the two radio paths. In this manner hybrid coil losses and echo effects may be greatly reduced or eliminated.

When it is desired to so operate the system, the talking key 811 is operated to its four-wire position. That is, the left-hand set of contacts, as shown in Fig. 8, are operated. With the key 811 so operated, the transmission path from the transmitter 825 extends through the operating contacts of key 811 to the transmission path 710 and then through the repeater and over the radio channel, in the manner described above. This transmission path also extends over the transmission path 815 and then through the other repeater equipment 445 and over the other radio channel extending in the other direction. Likewise, the receiver 824 is connected both to the transmission path 715 extending from the position modulation receiver shown in Figs. 5 through 7, inclusive, and also over conductor 836 to a similar receiving path from the other repeater equipment 445. In this manner transmitter 825 is equipped to transmit over both radio paths when the switch 826 is operated and receiver 824 is connected to both of the receiving paths through the two repeaters. It should be noted that the transmission from the transmission path 710 through the repeater equipment, comprising tubes 611, 616, 619 and the associated demodulating equipment described above, will provide so-called side tone in the receiver 824. In the foregoing manner the attendant is enabled to both transmit and receive over both radio paths.

For such operation, however, the two-wire communication paths are disconnected from the handset 831 as well as from the radio system; consequently, the attendant can only talk over the radio system. He cannot talk to the other attendant unless the other attendant has his key, corresponding to the key 811, operated either to the four-wire or the two-wire radio position. Neither can communication take place between line 820 and the radio system or between the tower and the radio system over line 818.

When it is desired to permit transmission from lines 820 or 818 over the radio system, it is necessary to operate the key 811 to the two-wire radio position 2W where the right-hand set of contacts are operated. With the key 811 so operated, handset 831 is connected in the two-wire circuit, as described above, and in addition, the windings 832 of hybrid coil are connected to the talking paths 710 extending to the radio system. Likewise, the windings 833 of the hybrid coil 822 are connected to the transmission path 715 which receives signals from the radio system. Under these conditions, signals arising on any of the lines are transmitted to all of the other lines and also over the radio system. Under these conditions, however, it is necessary to maintain a sufficient hybrid coil balance to prevent echo or singing on any of the connected loops.

*Ringing over the radio*

When it is desired, the attendant at the repeater station may ring over the radio by operating the ringing key 812 to the radio position, that is, by causing the left-hand contacts of key 812 to be operated. Operation of the left-hand contacts of key 812 applies ringing voltage to the conductors 815. The magnitude of the ringing voltage applied to conductors 815 is reduced by resistances 829 and 830 which form a potentiometer so that the time modulation or position modulation of the pulses will not exceed a maximum value. This is necessary first, to prevent overloading of the channel and second, to prevent over-modulation so that it is impossible for one of the pulses to be moved in time into a time assigned to another pulse.

When ringing current is applied to conductors 815, this ringing current also extends through the right-hand break contacts of key 810 and conductors 710, and through transformer 610 where it acts in the same way as speech currents and causes the array of pulses to be time-modulated in the same manner as described above with reference to speech currents.

Ringing current applied to the transmission path 815 is transmitted to the other bridging unit 446 and through to the other repeater 445 and thence over the radio system in the opposite direction, in a manner similar to that described above with reference to repeaters shown in Figs. 5, 6 and 7.

In addition, sufficient ringing current will be transmitted through the hybrid coil 822 from the ringing generator 913 on the tower or from line 820 to the terminal equipment 819, and thence through resistance 827 to conductors 815 and 710 to cause ringing current to be transmitted over both radio paths in the manner described above. Condenser 828 is provided to permit the voice frequency currents to readily pass through it but prevent the ringing currents from being shunted by the hybrid coil 822.

When the array of pulses which has been time or position modulated in accordance with ringing currents is received over the radio channel, these pulses are demodulated in the manner described above with reference to speech currents and cause a voltage of the ringing frequency to appear across the resistor 720.

Filter 719 is connected to the resistor 720 and serves first to reduce the other signaling voltages more than the ringing voltages appearing across this resistor.

Ringing current is applied through the coupling condenser 745 to the left-hand section of tube 718. The left-hand section of tube 718 is connected as a diode rectifier and causes a negative voltage drop across resistance 746 in response to the application of ringing current to it through the coupling condenser 745. This negative voltage is applied through coupling resistor 747 to the grid of the right-hand section of tube 717. The grid of this tube is also connected to condenser 748 which serves to retard the response of the right-hand section of tube 717. This delay interval is provided to render the circuit insensitive to static and other spurious currents, the resistor-condenser filter 747 and 748 also reduces the alternating current component due to the ringing. The application of a negative potential to the grid of the right-hand section of tube 717 causes the plate current flowing through this section to be reduced, which in turn reduces the potential drop across resistor 744. In other words, both the anode of the right-hand section of tube 717 and the grid of the right-hand section of tube 718 become more positive. As a result tube 718 will pass sufficient current to operate relay 714.

At the termination of ringing current received over the system the negative voltage drop across resistor 746 disappears with the result that the right-hand section of tube 717 becomes more conductive and lowers the grid potential of tube 718 so that the relay 714 will release due to the decrease in plate current flowing through the right-hand section of tube 718.

The operation of relay 714 connects ringing current to lead 737 and thus causes ringer 814 as well as the corresponding ringer of the bridging unit 446 to operate and attract the attention of the attendants.

If ringing current is received from the opposite direction of transmission the repeater 445 will operate in a manner similar to that described above and cause ringing current to be applied to conductor 835 which again causes the ringer 814 to be actuated.

Thus in addition to being able to communicate in both directions over the system by means of the time modulation of the entire array of pulses, the attendants are able to transmit supervisory signals in the form of ringing current in both directions over the system to call attendants at the other repeater points. It should be noted that the application of ringing current to the modulation system is limited so that the total maximum time displacement of any of the pulses will be insufficient to cause a pulse to appear in any time interval not assigned to it.

*Emergency pulses*

Figure 6:
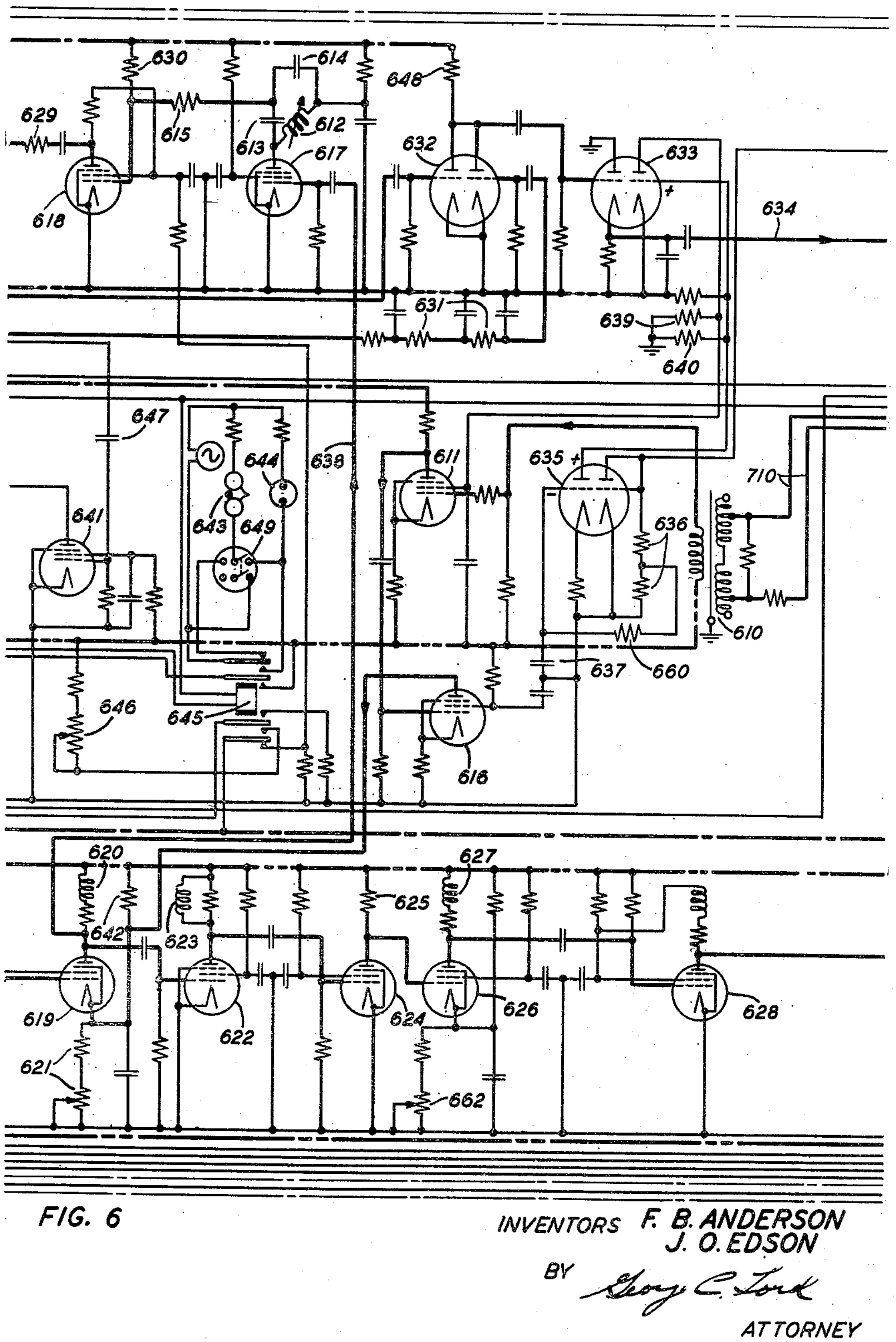
Figure 7:
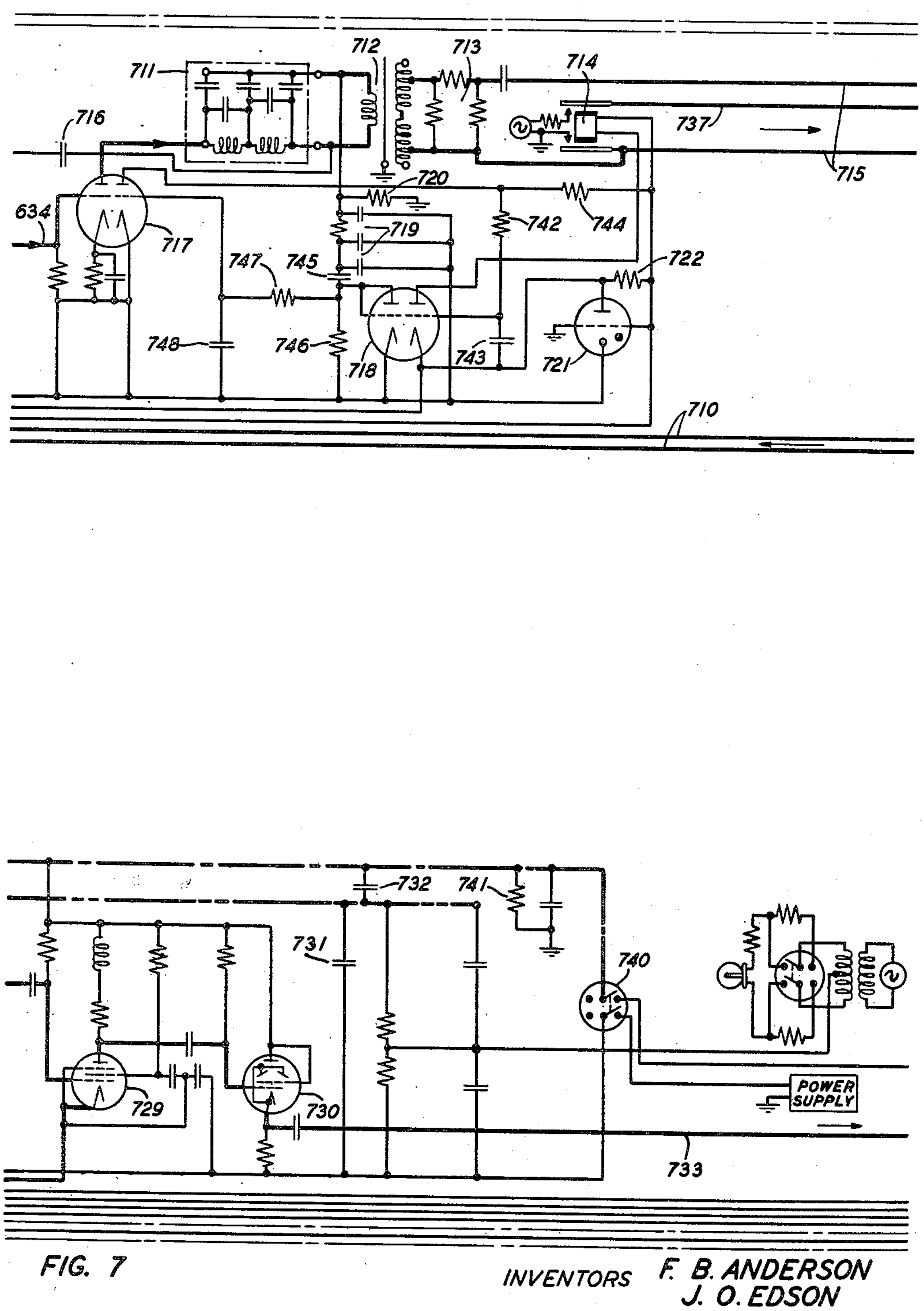

The pulses received from the intermediate frequency and video amplifier 440 in addition to being applied to tube 510 through the coupling condenser 521 are also applied to a control element of tube 538. A resonant circuit comprising a capacitor 546 and inductor 547 is connected in the anode circuit of tube 538 and is tuned to resonate at the frequency of the applied pulses. The decrement of this resonant circuit is low or its Q is high so that oscillating current will flow in this resonant circuit for an appreciable period of time even in the absence of applied pulses. In this manner a continuous alternating current or voltage is generated in the resonant circuit even though the pulses are received in a random manner. The anode of tube 538 is connected through the coupling condenser 539 to the left-hand section of tube 540. The left-hand section of tube 540 is connected as a diode so that a negative voltage appears across resistor 541 in response to the application of the alternating current from the resonant circuit comprising inductor 547 and capacitor 546. The negative voltage generated across resistor 541 counteracts the positive voltage supplied through the upper portion of resistance 544 from resistor 545 and maintains the grid of the right-hand section of tube 540 sufficiently negative to prevent current flowing in the output circuit of the right-hand section of tube 540. Consequently, during the time pulses are being received from the radio system, relay 645 which is connected to the anode of right-hand section of tube 540 is released as shown in Fig. 6 and the system operates in the manner described above.

For the system so far described failure of transmission in any link would disrupt communications between all succeeding points in the system. To alleviate this undesirable situation and maintain order wire service over all possible links, each of the repeaters has been provided with an emergency source of pulses which is automatically turned on upon the failure of the received pulses. This permits maintenance of order wire facilities on all links not directly affected by the fault and thus aids operating personnel in isolation of trouble.

Upon the failure of received pulses from the radio receiver the oscillations in the resonant circuit comprising inductor 547 and capacitor 546 die out with the result that no negative voltage is generated across resistor 541. At this time the voltage applied to the upper terminal resistor 544 becomes effective to make the grid of the right-hand section of tube 540 more positive so that current will then flow in the plate circuit of the right-hand section of tube 540 causing relay 645 to be operated. Relay 645 when operated causes the bell or ringer 643 to be actuated and lamp 644 to light, switch 649 being in the right-hand position. The voltage applied to resistor 544 is adjusted by means of potentiometer 545 so that negative bias on the right-hand grid of tube 540 due to noise voltages may be overriden, and at the same time the negative bias in response to incoming signals will be of sufficient magnitude to cut off the plate current of the right-hand section of tube 540 and release the relay 645.

The closing of its lower inner contacts by the operation of relay 645 reduces the screen potential of tube 513 so that this tube becomes cut-off and is incapable of amplifying or transmitting received signals or pulses. At the same time the upper inner operated contacts of relay 645 complete the circuit for the screen of tube 543 so that this tube will function as a normal amplifier tube and transmit pulses applied to its grid. The output of tube 543 comprising a regular array of 160,000 pulses per second is connected to the input of tube 515 whereupon the remaining tubes of the amplifier operate in substantially the same manner as described above.

Upon noting the lighted lamp 644 and hearing the bell 643, the attendant may operate switch 649 to the left-hand position and silence the bell. Lamp 644, however, will remain energized so long as the supply of pulses from the radio system is interrupted.

The output from the plate of tube 524 in the oscillator circuit described above is connected through the coupling condenser 647 to the grid of tube 641. Tube 641 operates as an overbiased amplifier tube. The output of tube 641 is connected to the screen of both sections of tube 542. The two sections of tube 542 are connected as a multivibrator circuit whose natural frequency is somewhat less than 160,000 cycles per second, so that upon the application of negative pulses to the screens of both sections, at a 320,000 cycles per second rate, the multivibrator is forced to operate at exactly one-half the frequency of the applied pulses. The constants of the multivibrator are so chosen that the above-described operation takes place in the well-understood manner. The output of the left-hand section of tube 542 is differentiated by the resistor-condenser circuit 548 so that a sharp negative pulse is applied to the grid of tube 543 each time the left-hand section of tube 542 becomes conducting. The duration of this pulse is controlled by the constants of the differentiating circuit 548. Upon the application of a negative pulse to the control element of tube 543 a positive pulse appears in the output circuit of tube 543 which pulse is applied to the input circuit of tube 515. Thus due to the operation of tube 542 a negative pulse is applied to the grid of tube 543 for each alternate cycle of the output of the 320-kilocycle oscillator, and pulses will be applied to the input circuit of tube 515 and to other tubes of the amplifier. These pulses are substantially the same and on the average will appear as frequently as the received pulses. As a result the duty cycle on the radio system as well as most of the other tubes of the repeater will remain substantially the same for both regular and emergency operation.

In order to compensate for differences in the tubes and related circuits during the emergency condiiton, the lower operated contact of relay 645 is employed to again balance the voltages applied to bus bar 530 and thus applied to the parious tubes by means of resistor 646.

Inasmuch as the emergency pulses generated in the manner described above will not be position modulated, the demodulating equipment and in particular tube 618 is rendered non-responsive to these pulses because the screen potential is reduced by the operation of the lower set of break contacts of relay 645. Relay 645 operated also prevents the input of controlling pulses to the oscillator circuit.

Thereafter so long as no pulses are received from the radio system the circuits operate in the manner described above.

Upon the reception of pulses from the radio system oscillating current will again flow in the resonant circuit in the output circuit of tube 538 and again generate a negative voltage across resistor 541 which voltage is applied to the grid of the right-hand section of tube 540 and causes relay 645 to release and restore the system to its normal operating condition.

A switch 551 is provided for reducing the grid potential of the right-hand section of tube 540 so that the emergency supply of pulses and the operation of the system in response thereto may be tested at will by the attendant at the repeater point. Switch 551 is normally open and is closed for testing purposes only as described above.

*Summary*

Figure 3:
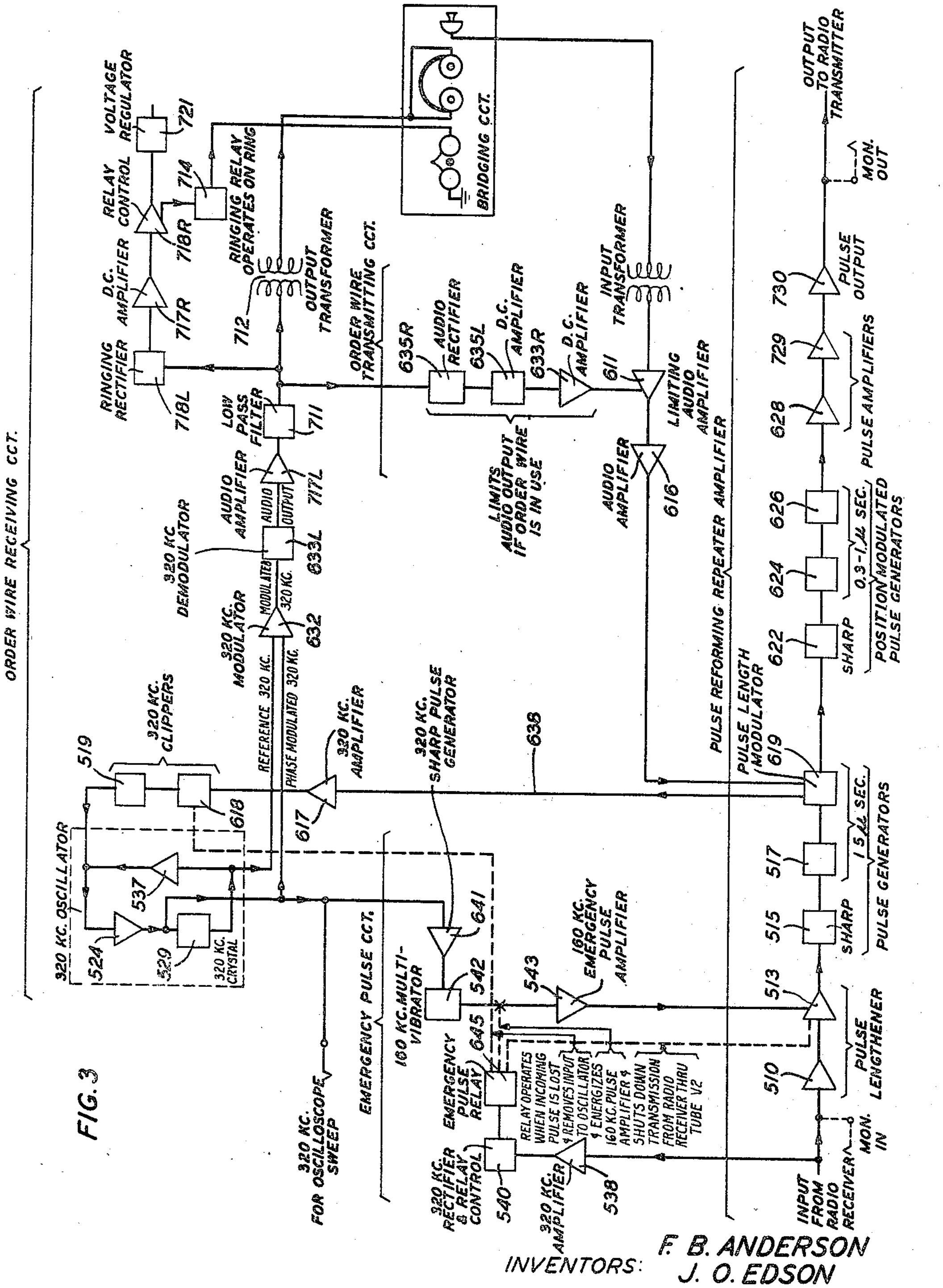
Fig. 3 shows in outline form the functions performed by various elements of the repeater equipment located at each of the radio relay repeater points.
Figure 4:
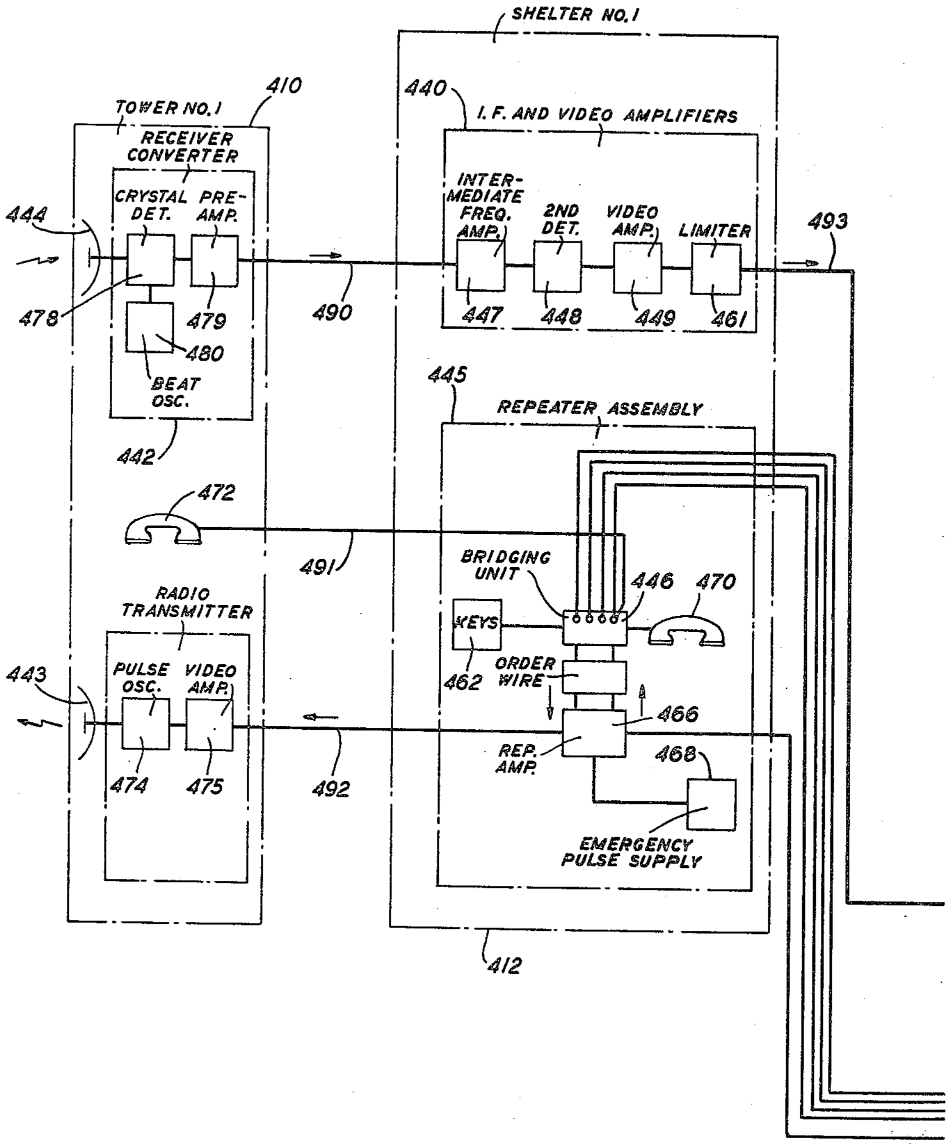
Figure 5:
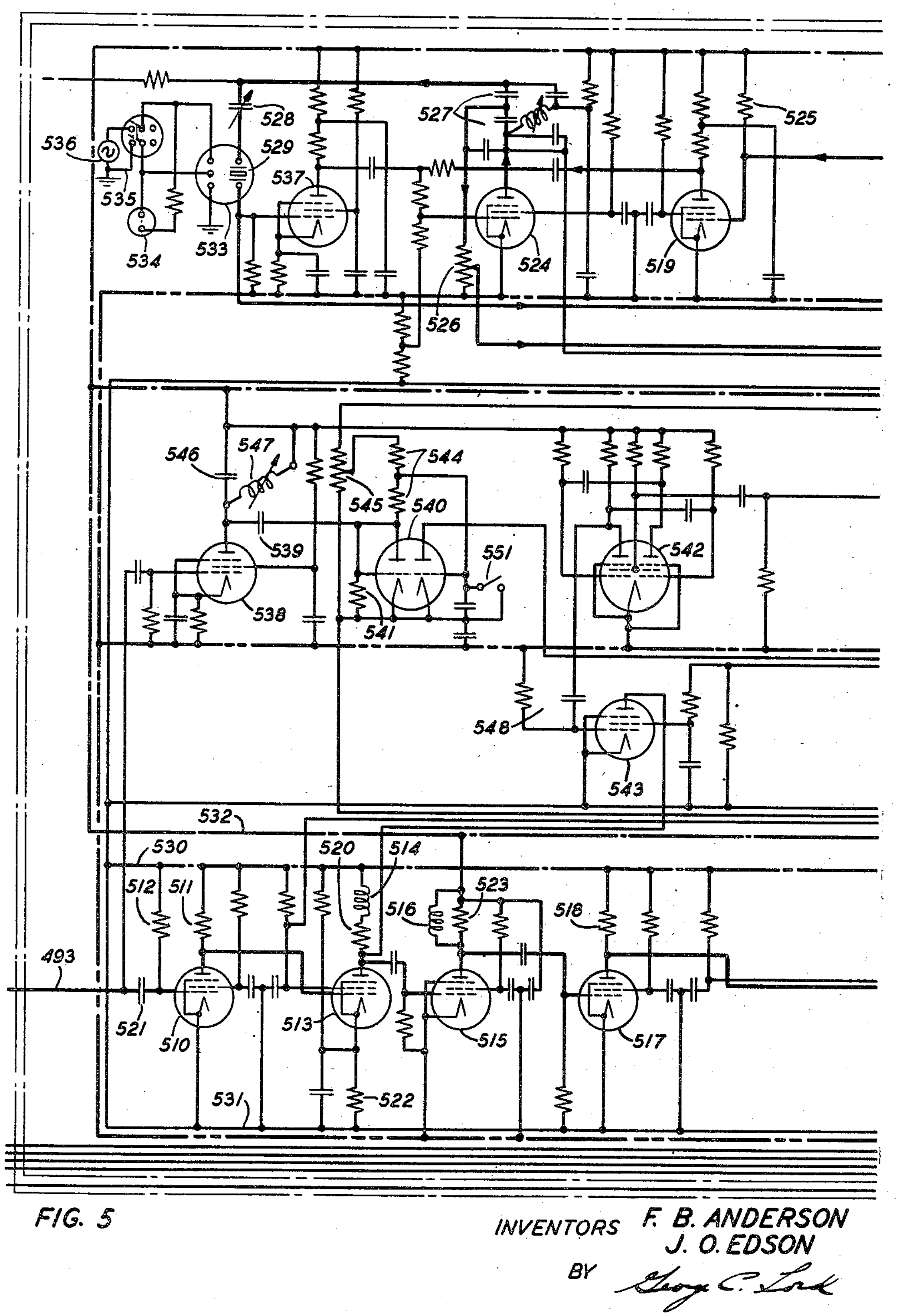

Fig. 3 is functional diagram showing the system in block schematic. For convenience the reference numerals used correspond to those of the detailed schematic circuit of Figs. 4–9. Signals received from the radio receiver are transmitted through a pulse transforming and repeating amplifier comprising pulse lengthener tubes 510 and 513 followed by a sharp pulse generator 515 which produces a sharp pulse at the trailing edge of each lengthened pulse. The sharp pulse generator is followed by pulse lengthening tubes 517 and 619 and circuits which are adjusted to produce pulses having an average length of approximately 1½ microseconds, i. e., an average length equal to one-half the time interval assigned to each of the pulses. This circuit is in turn followed by another sharp pulse generator 622 which is likewise actuated by the trailing edges of the pulses applied to it. The second sharp pulse generator is followed by another pulse lengthening arrangement comprising tubes 624 and 626 which is employed to lengthen the pulses to the desired length as required by the radio transmitting system. This final pulse-lengthening circuit is followed by pulse amplifiers 628 and 729 and by a pulse output tube 730 which is employed to transmit the pulses over a transmission line to the radio transmitter.

The output of the 1½ microsecond pulse generator is amplified by an amplifier 617. A resonant circuit is connected in the output of this amplifier which resonant circuit has a low decrement so that an oscillating current continues to flow in it during the times when pulses of one type are received but are of a type which is not employed to maintain the oscillating current. The output of this amplifier is then passed through some limiting and clipping amplifiers 618 and 519 to a crystal-controlled oscillator circuit including tubes 524 and 537. Pulses are employed to maintain the oscillator frequency substantially in synchronism with the received pulses. In addition the pulses are passed through the crystal element 529 and the time variations thereof substantially removed. These pulses then serve as a reference which is compared with the pulses having a time variation by means of a modulator tube 632. The modulated signals are then demodulated by the tube 633 and transmitted through an audio amplifier 717 and filter 711 to a receiving circuit at the repeater point. The output of the low pass filter in the audio system is employed to regulate the gain of the transmitter circuit to the repeater circuit. The repeater station is provided with transmitting means for transmitting signals which are transmitted first through an audio amplifier V23 and then to a final amplifier V24 to the pulse length modulator portion 619 of the 1½ microsecond pulse generator, described above. An audio rectifier 635R and the limiting amplifier 635L are connected to the output of the low pass filter in the receiving circuit. The output of the amplifier 635L is passed through amplifier 633R and finally controls the gain of an audio limiting amplifier 611.

Provision has been made also for transmitting and receiving ringing current over the radio system for calling attention of the attendants.

The output of the filter is also applied to a ringing rectifier 718L and a direct current amplifier 717R and relay control tube 718R for controlling the source of ringing current applied to attract attention of the attendant.

Emergency pulse generation circuits are also provided which are automatically connected to the system when the supply of pulses from the radio receiver is interrupted for any reason. The interruptions may be due to circuit failure at the previous repeater or terminal point in this system, or may be due to failure in the transmission over the radio path, or may be due to failure of equipment in the repeater station in question.

Normally pulses from the radio receiver are amplified by pulse amplifier 538 and applied to a rectifier 540 and control relay 645 which serves to condition for operation the emergency pulse generator equipment. Relay 645 which is controlled by the rectifier 540 also disables part of the first pulse lengthener so that the random noise which may be received from the radio system is ineffective to mutilate the emergency pulses. The emergency pulse generating equipment comprises a sharp pulse generator 641 supplied from the oscillator. The sharp pulse generator in turn controls a multivibrator 542 which serves to generate pulses from alternate pulses from the over-biased 320 kilocycle amplifier to pulse the reforming and repeating amplifier.

Thus in the absence of received pulses a supply of emergency pulses is generated and transmitted over the radio system. By providing such an emergency source of pulses the attendant is permitted to pulse position or pulse time modulate the emergency pulses and thus transmit and communicate over this system to other repeater or terminal points and thus cooperate in reestablishing the normal operation of the system. The attendant is also enabled to transmit supervisory circuit signals such as ringing signals over the system to attract the attention of the attendants and for other supervisory purposes when required.

Persons skilled in the art will understand that the invention set forth in the claims appended hereto is not necessarily limited to any of the specific details described with reference to the exemplary system embodied in the present invention. Numerous alternatives to the various circuits and apparatus may of course be employed without departing from the scope of the invention as will be apparent to persons skilled in the art.

What is claimed is:

1. In a communication system, a source of permutation code groups of pulses each group comprising successive pulses, each of one of a plurality of different signaling conditions, and representing in accordance with the permutation code the instantaneous value of a message wave, and means for modulating the time position of said pulses in accordance with another message wave to simultaneously transmit both said message waves.

2. In a communication system, a source of recurrent frames of pulses, each frame comprising successive permutation code groups of pulses and each group comprising successive pulses, each of one of a plurality of different signaling conditions, and representing in accordance with the permutation code the instantaneous value of a respective message wave, and means for modulating the time positions of the pulses in each frame in accordance with the instantaneous value of a different message wave to transmit said different message wave simultaneously with the message waves represented by said code groups of pulses.

3. In a communication system, a source of permutation code groups of successive on-off pulses, each group representing in accordance with the permutation code the instantaneous value of a message wave, and means for modulating the time position of the on pulses of said code groups in accordance with another message wave to transmit said other wave simultaneously with the first message wave.

4. In a communication system, a source of recurrent frames of permutation code groups of successive on-off pulses, each group representing in accordance with the permutation code the instantaneous value of a respective message wave, and means for modulating the time position of the on pulses of each frame in accordance with the instantaneous value of an additional message wave to transmit such additional wave simultaneously with the message waves represented by the respective code groups.

5. In a communication system, a source of successive permutation code groups of pulses, each group comprising successive pulses, each of one of a plurality of different signaling conditions, and representing in accordance with the permutation code the instantaneous value of a message wave, means for producing from each pulse of one of said signaling conditions a new pulse of variable length, means for modulating the length of said new pulses in accordance with another message wave, and means for differentiating the modulated pulses to produce new pulses of said one of said signaling conditions modulated in time position in accordance with said other message wave.

6. In a communication system, a source of successive permutation code groups of successive on-off pulses, each group representing in accordance with the permutation code the instantaneous value of a message wave, means for producing from each on pulse a new pulse capable of being varied in length, means for modulating the length of said new pulses, and means for differentiating the modulated new pulses to produce new on pulses modulated in time position in accordance with said other message wave.

7. In a communication system, a source of successive permutation code groups of pulses, each group comprising successive pulses, each of one of a plurality of different signaling conditions, and representing in accordance with the permutation code the instantaneous value of a message wave and having the pulses of one of said signaling conditions modulated in time position in accordance with another message wave, means synchronized by the pulses of said code groups for producing reference oscillations of substantially constant frequency equal to the rate of occurrence of said pulses when unmodulated in time position, means for comparing in phase the pulses from said source with said reference oscillations to produce a wave modulated in amplitude in accordance with said other message wave, and means for detecting said amplitude modulated wave to reproduce said other message wave.

8. In a communication system, a source of successive permutation code groups of pulses, each group comprising successive pulses, each of one of a plurality of different signaling conditions and representing in accordance with the permutation code the instantaneous value of a message wave and having the pulses of one of said signaling conditions modulated in time position in accordance with another message wave, a damped resonant circuit tuned to the normal frequency of occurrence of said pulses of said groups, means for exciting said damped resonant circuit by said pulses of said groups to produce a continuous array of pulses of said one of said signaling conditions modulated in accordance with the time modulation of said pulses, means synchronized by the pulses of said continuous array for producing reference oscillations of substantial constant frequency equal to said normal frequency, means for comparing in phase the pulses of said array with said reference oscillations to produce a wave modulated in amplitude in accordance with said other message wave, and means for detecting said amplitude modulated wave to produce said other message wave.

9. In a communication system, a source of permutation code groups of successive on-off pulses, each group representing in accordance with the permutation code the instantaneous value of a message wave and having the on pulses modulated in time position in accordance with another message wave, a damped turned circuit resonant at the frequency of occurrence of said on-off pulses, means for exciting said circuit by the pulses of said groups to produce continuous oscillations modulated in phase in accordance with the time position modulation of said on pulses, and means for demodulating said continuous oscillations to reproduce said other message wave.

10. In a communication system, a source of permutation code groups of successive on-off pulses, each group representing in accordance with the permutation code the instantaneous value of a message wave and having the on pulses modulated in time position in accordance with another message wave, a damped tuned circuit resonant at the frequency of occurrence of said on-off pulses, means for exciting said circuit by the pulses of said groups to produce continuous oscillations modulated in phase in accordance with the time position modulation of said on pulses, means synchronized by said continuous oscillations for producing reference oscillations of the same frequency as said continuous oscillations and of constant phase, means for comparing the phase of said continuous oscillations with that of said reference oscillations to produce a wave modulated in amplitude in accordance with the phase modulations of said continuous oscillations, and means for detecting the amplitude modulated wave to reproduce said other message wave.

References Cited in the file of this patent

UNITED STATES PATENTS

| | | |
|---|---|---|
| 2,531,846 | Goodall | Nov. 28, 1950 |
| 2,557,950 | Deloraine et al. | June 26, 1951 |